(12) United States Patent
Van Den Bulcke

(10) Patent No.: US 8,754,541 B2
(45) Date of Patent: Jun. 17, 2014

(54) LINEAR WIND POWERED ELECTRICAL GENERATOR

(75) Inventor: Marc Van Den Bulcke, Lac Brome (CA)

(73) Assignee: Design Protom Inc., Lac Brome, Quebec (CA)

( * ) Notice: Subject to any disclaimer, the term of this patent is extended or adjusted under 35 U.S.C. 154(b) by 0 days.

(21) Appl. No.: 13/516,319

(22) PCT Filed: Dec. 22, 2010

(86) PCT No.: PCT/US2010/061806
§ 371 (c)(1),
(2), (4) Date: Jun. 15, 2012

(87) PCT Pub. No.: WO2011/087844
PCT Pub. Date: Jul. 21, 2011

(65) Prior Publication Data
US 2012/0261926 A1    Oct. 18, 2012

Related U.S. Application Data

(60) Provisional application No. 61/289,161, filed on Dec. 22, 2009, provisional application No. 61/313,153, filed on Mar. 12, 2010, provisional application No. 61/321,705, filed on Apr. 7, 2010.

(51) Int. Cl.
*H02P 9/04* (2006.01)

(52) U.S. Cl.
USPC .............................................. 290/55; 290/44

(58) Field of Classification Search
USPC .................................. 290/44, 55; 416/7, 176
See application file for complete search history.

(56) References Cited

U.S. PATENT DOCUMENTS

| | | | |
|---|---|---|---|
| 4,049,300 A | | 9/1977 | Schneider |
| 6,072,245 A | * | 6/2000 | Ockels ............................ 290/55 |
| 6,672,522 B2 | * | 1/2004 | Lee et al. ........................ 290/55 |
| 7,075,191 B2 | * | 7/2006 | Davison .......................... 290/54 |
| 7,709,971 B2 | * | 5/2010 | Sane et al. ...................... 290/43 |
| 8,441,141 B1 | * | 5/2013 | Ouellette et al. ................ 290/55 |
| 2008/0279690 A1 | | 11/2008 | Rashidi |

FOREIGN PATENT DOCUMENTS

EP    2108818 A2    10/2009
JP    2001153026 A    6/2001

* cited by examiner

*Primary Examiner* — Vanessa Girardi
(74) *Attorney, Agent, or Firm* — Harness, Dickey & Pierce, P.L.C.

(57) ABSTRACT

An energy generation system includes an inner tower, an outer tower and a plurality of wind turbines. The outer shell defines a wind or fluid amplifying surface. The plurality of wind turbines is carried by the outer shell and disposed relative to the wind amplifying surface to harness wind deflected by the wind amplifying surface.

6 Claims, 43 Drawing Sheets

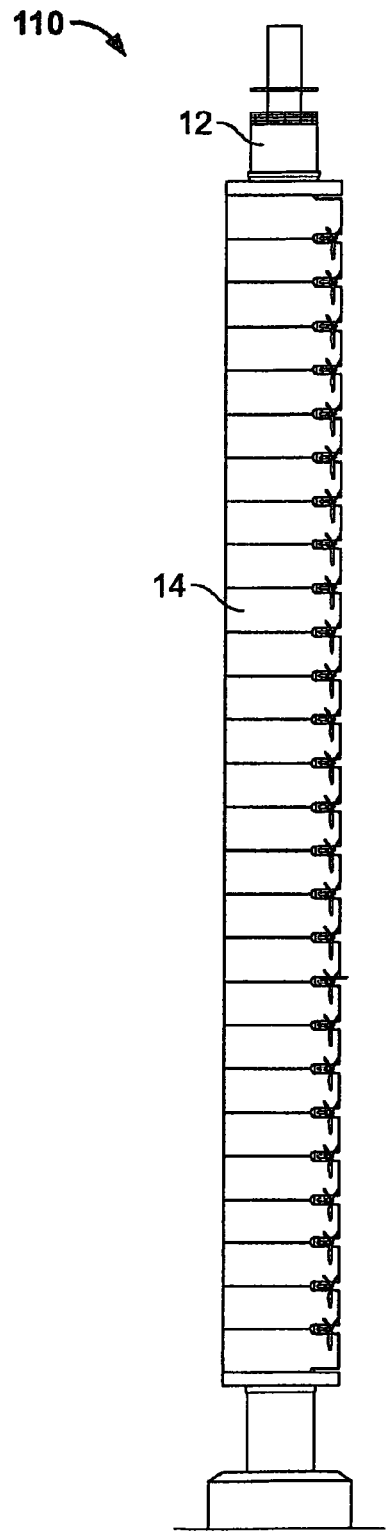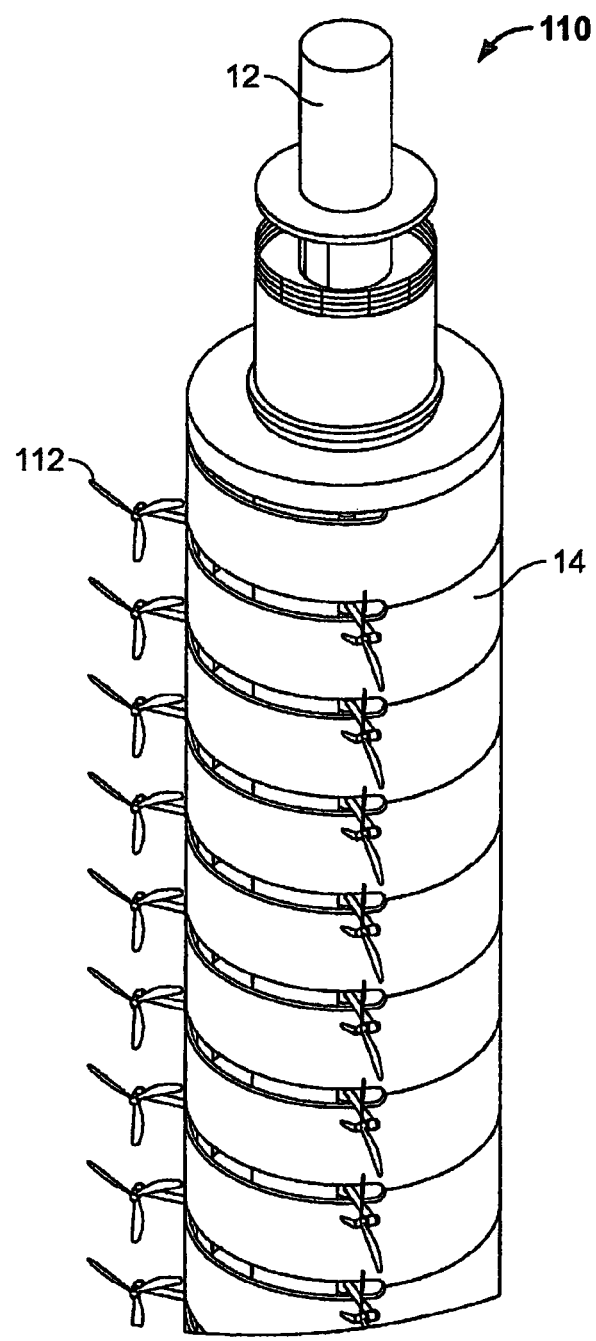
FIG. 7
FIG. 8

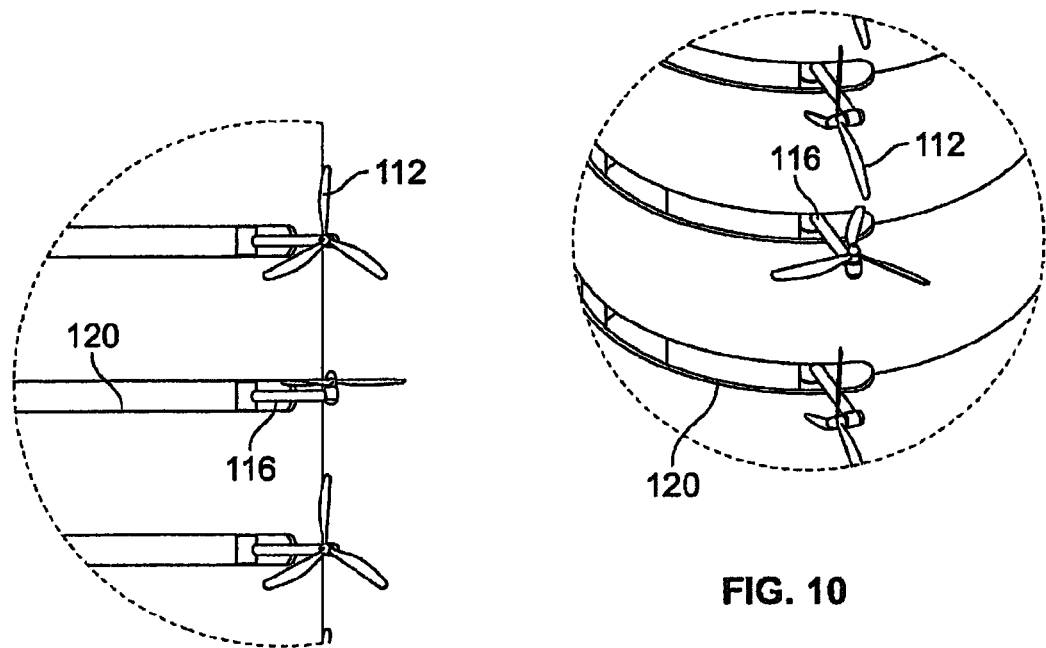
FIG. 9
FIG. 10
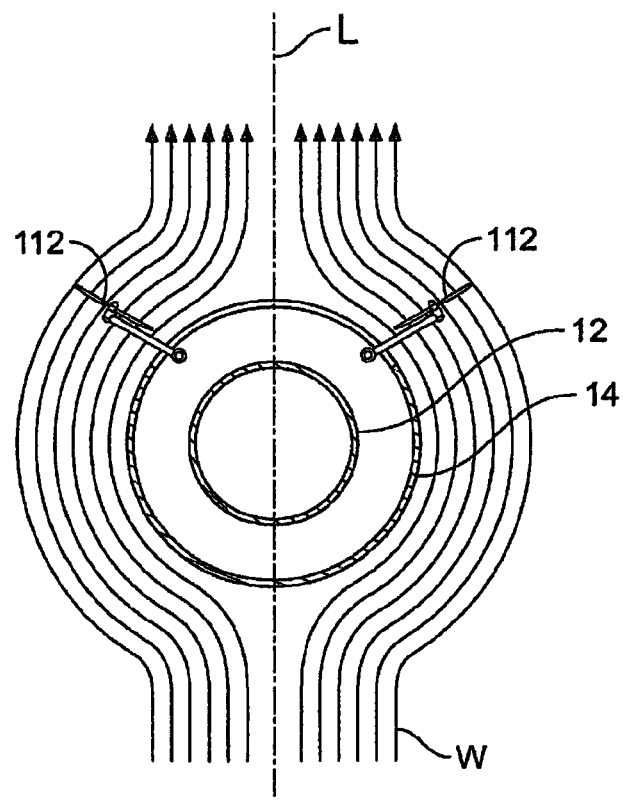
FIG. 11

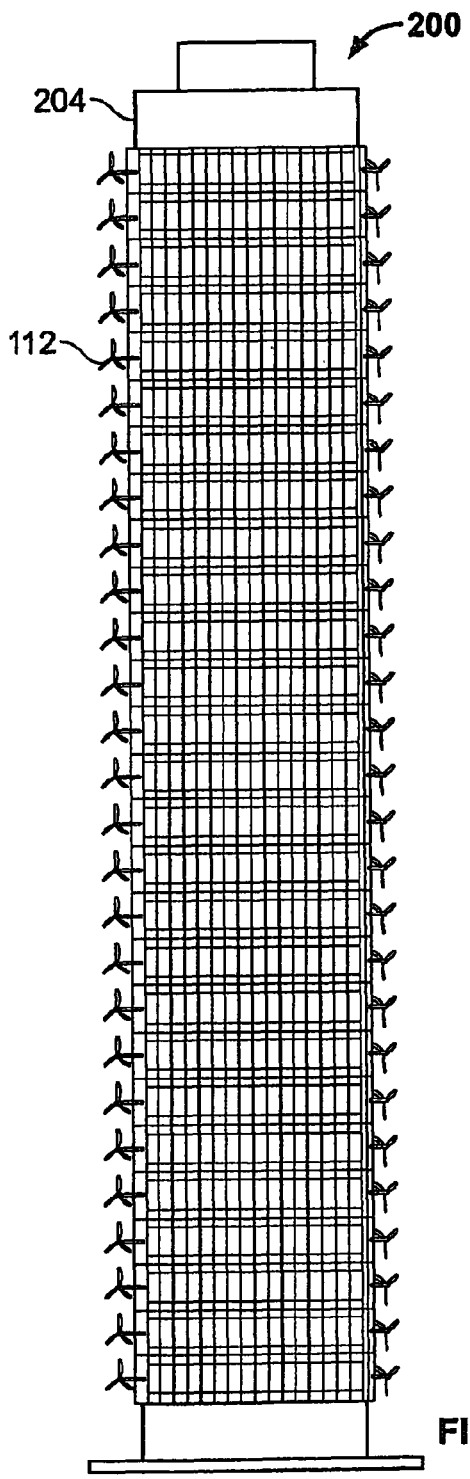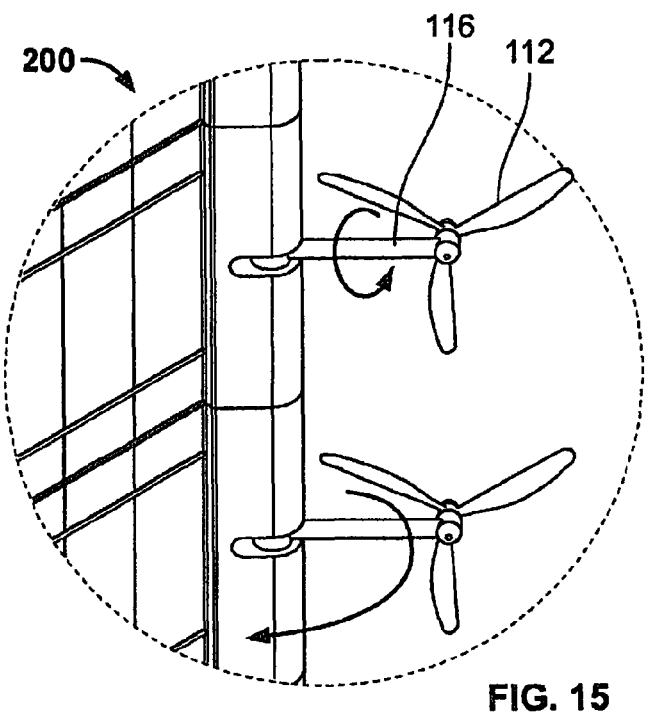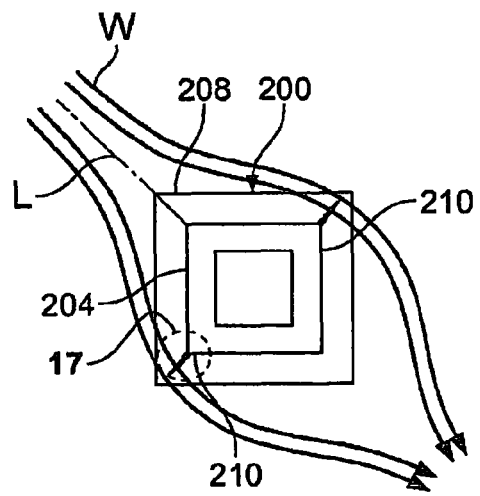
FIG. 14
FIG. 15
FIG. 16

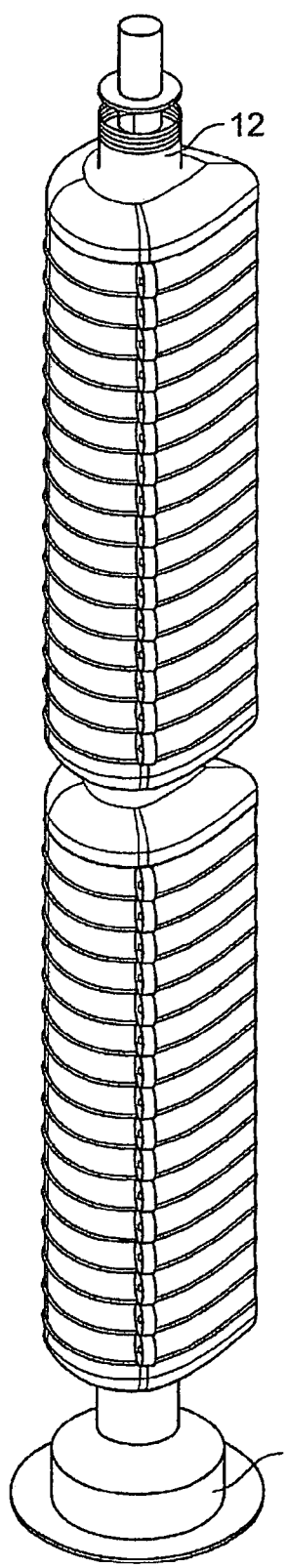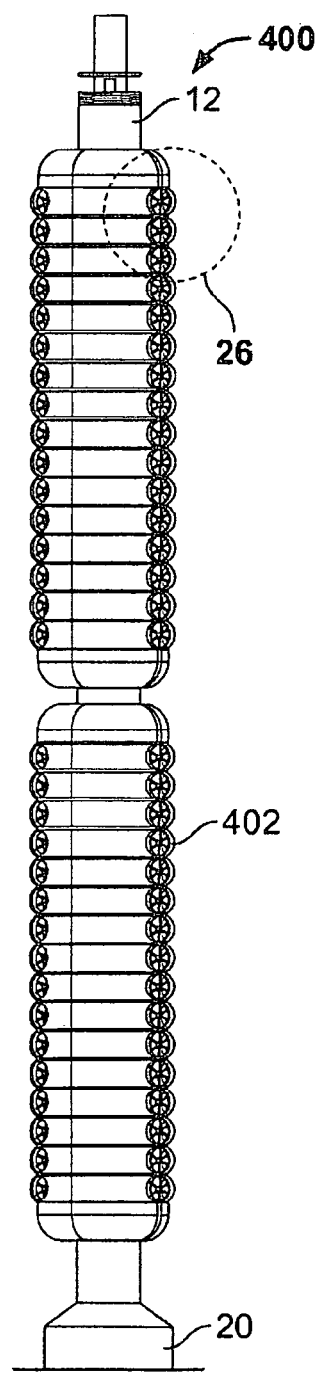
FIG. 21
FIG. 22

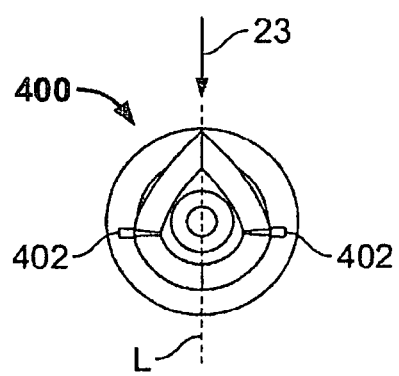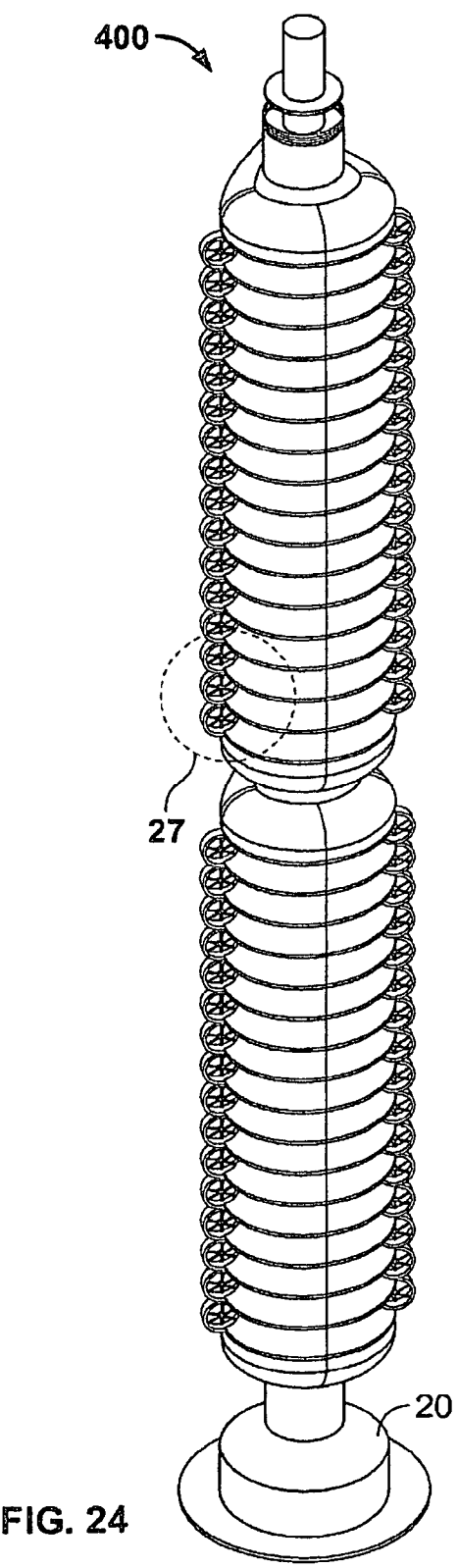
FIG. 23
FIG. 24

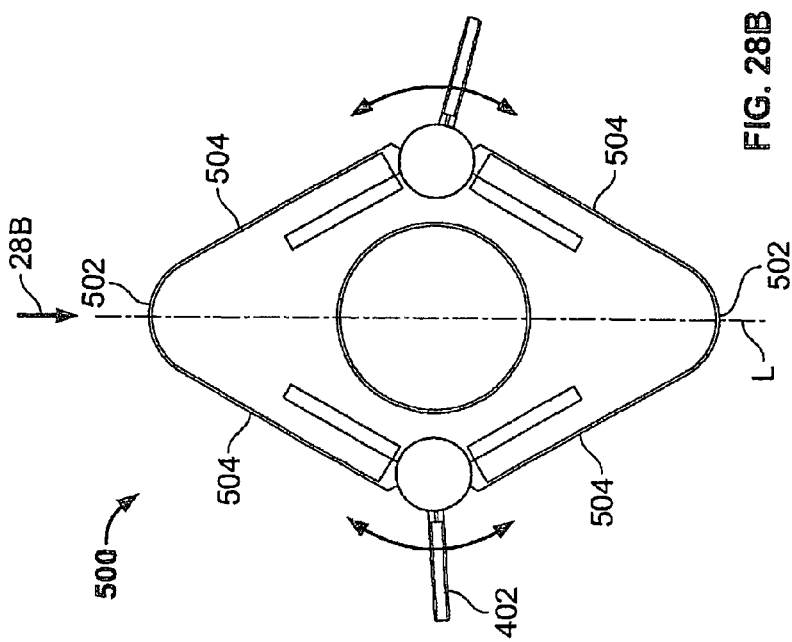
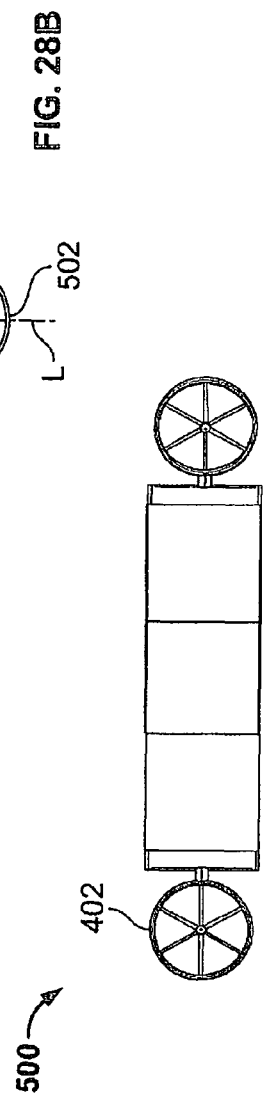
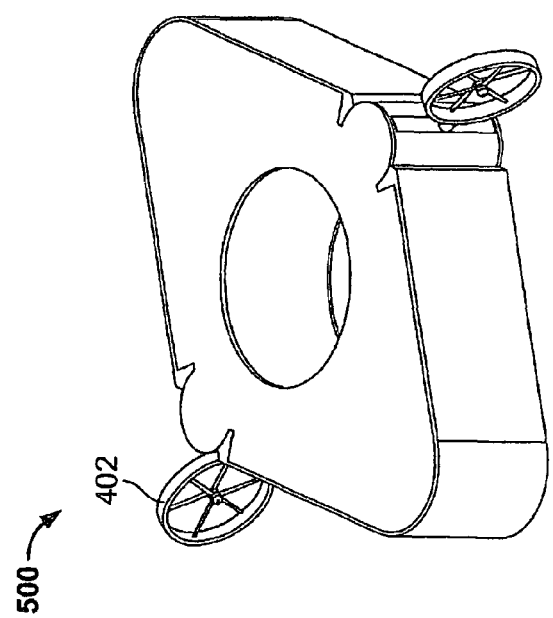

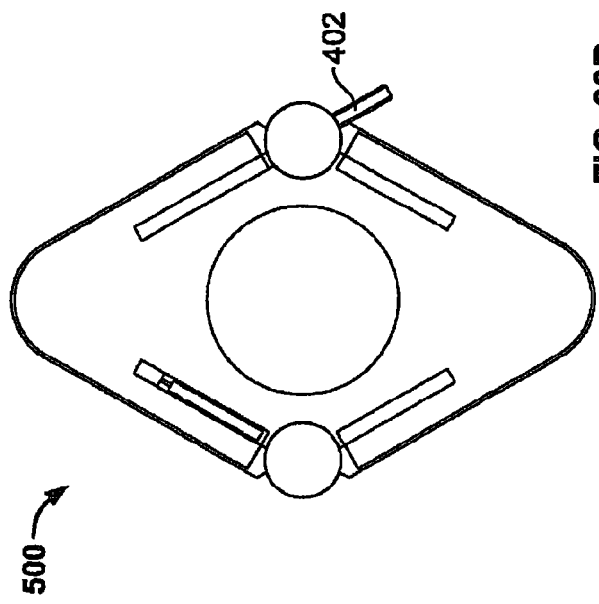
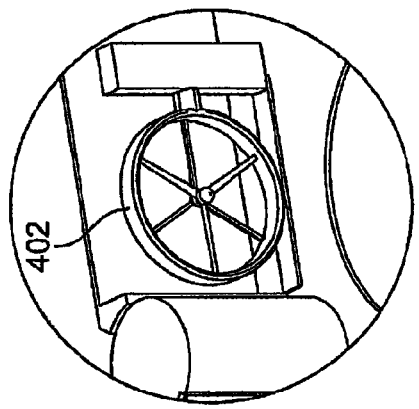
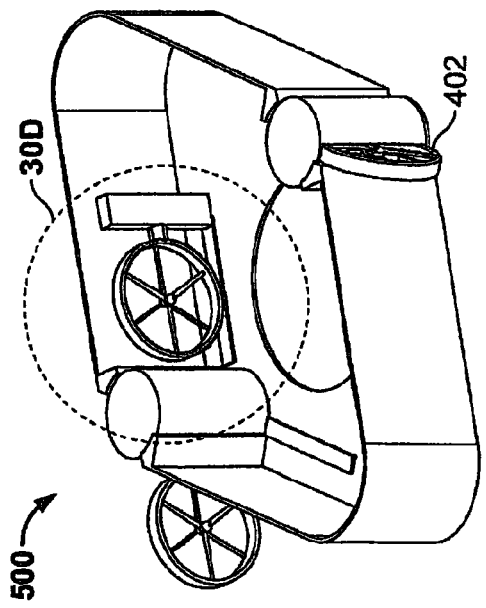
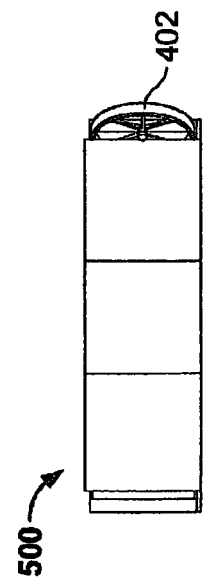
FIG. 30B
FIG. 30D
FIG. 30A
FIG. 30C

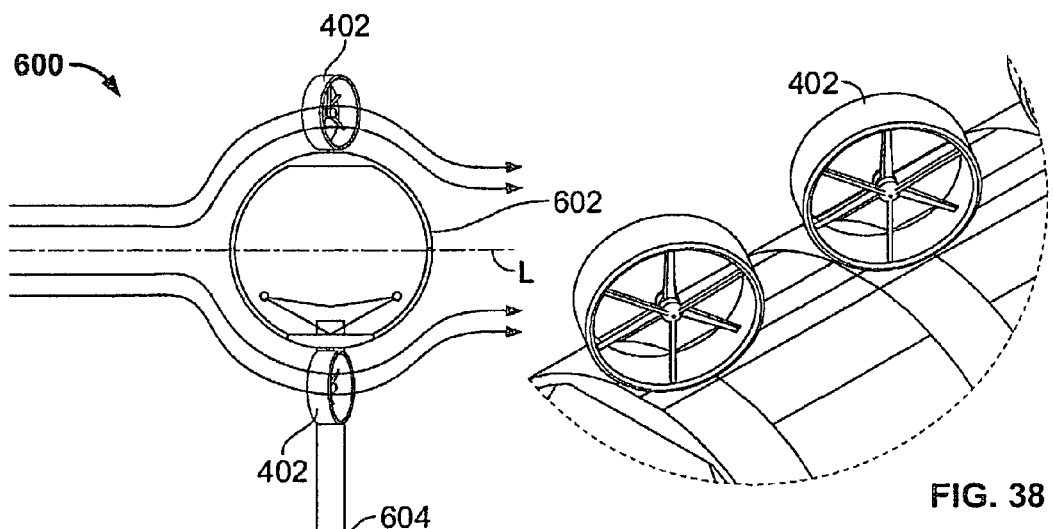
FIG. 37
FIG. 38
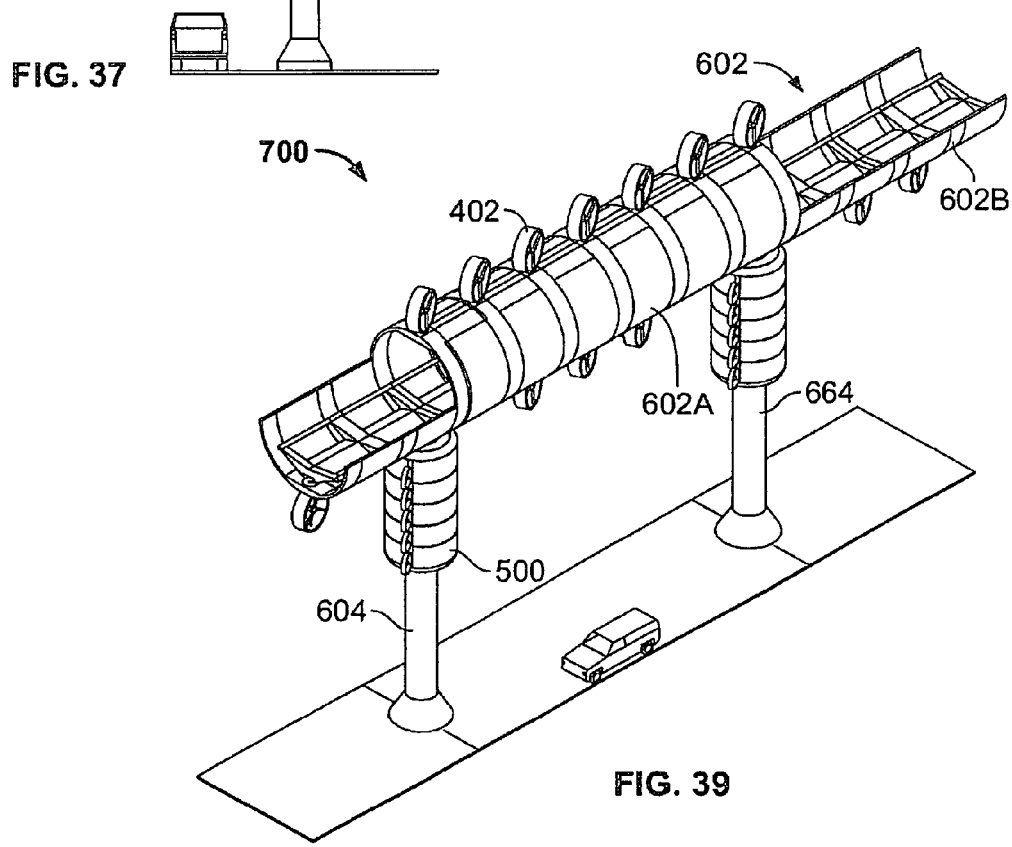
FIG. 39

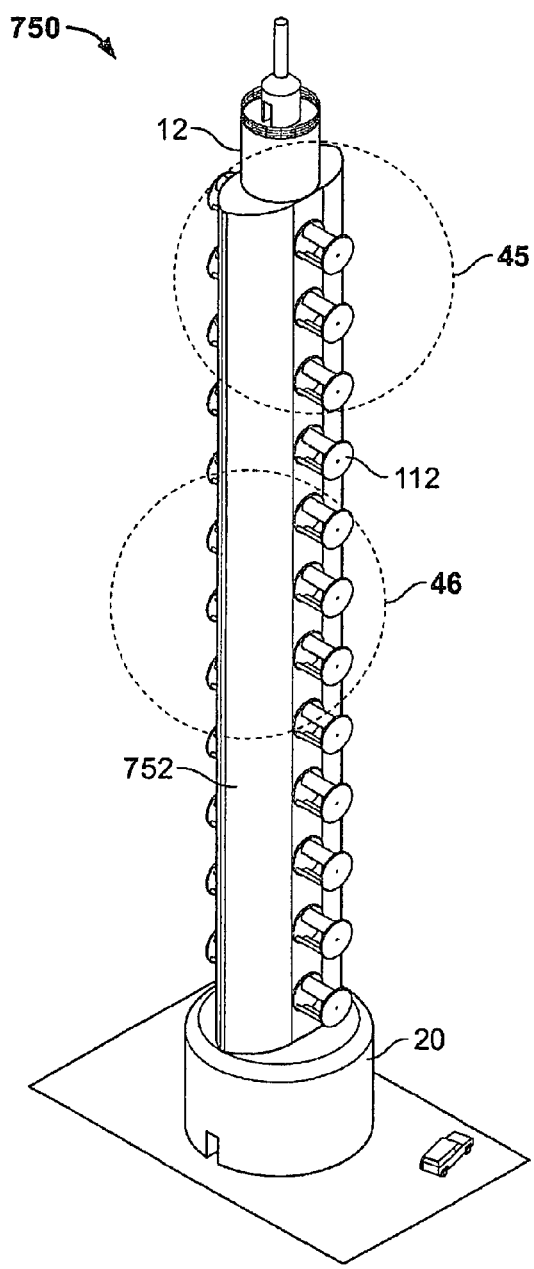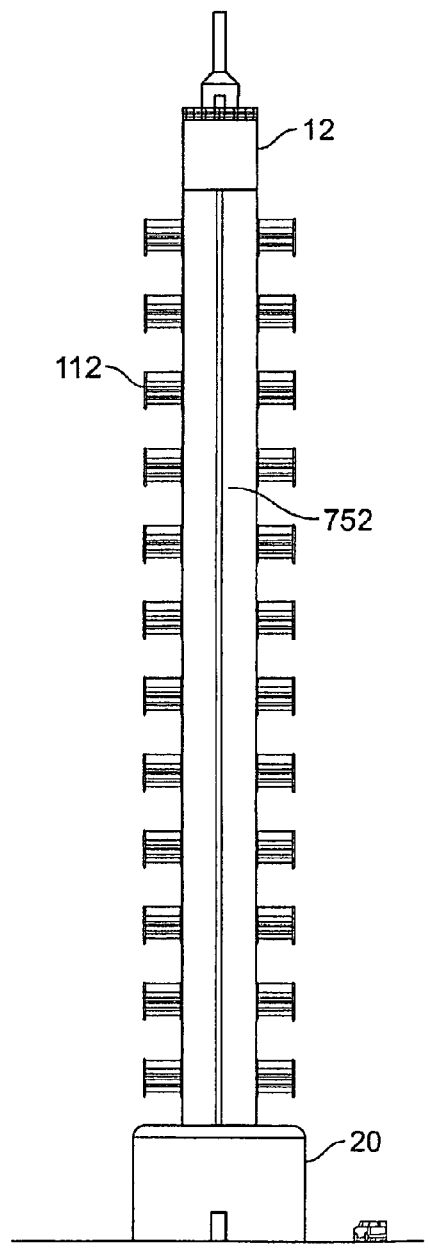
FIG. 42
FIG. 43

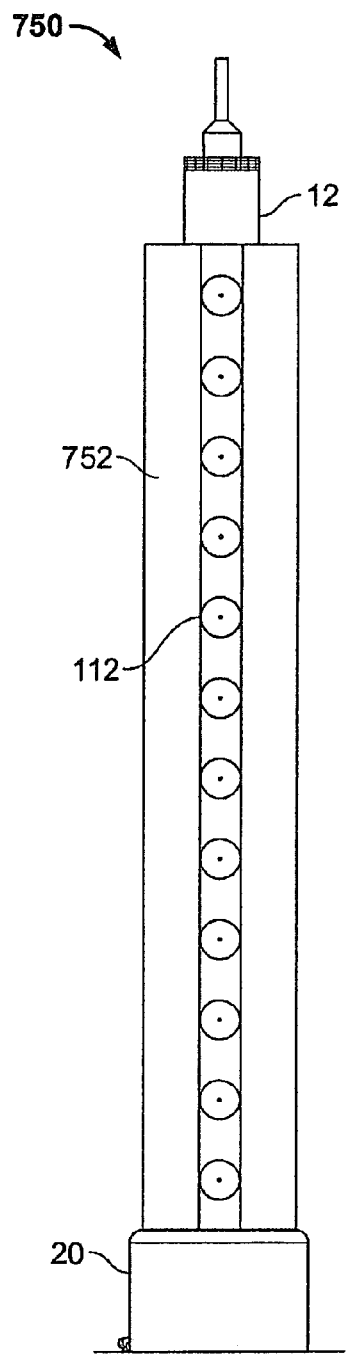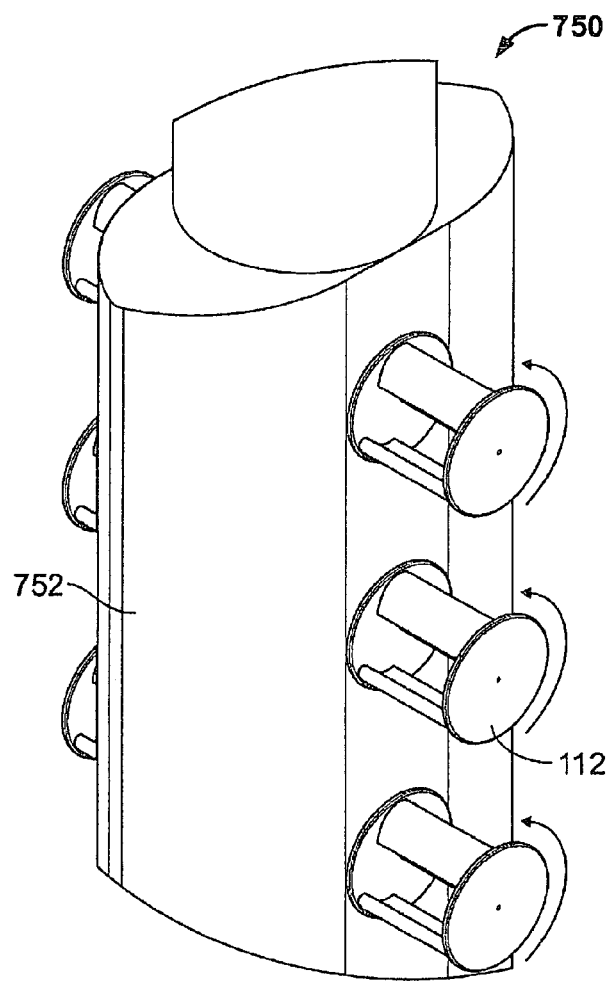
FIG. 44
FIG. 45

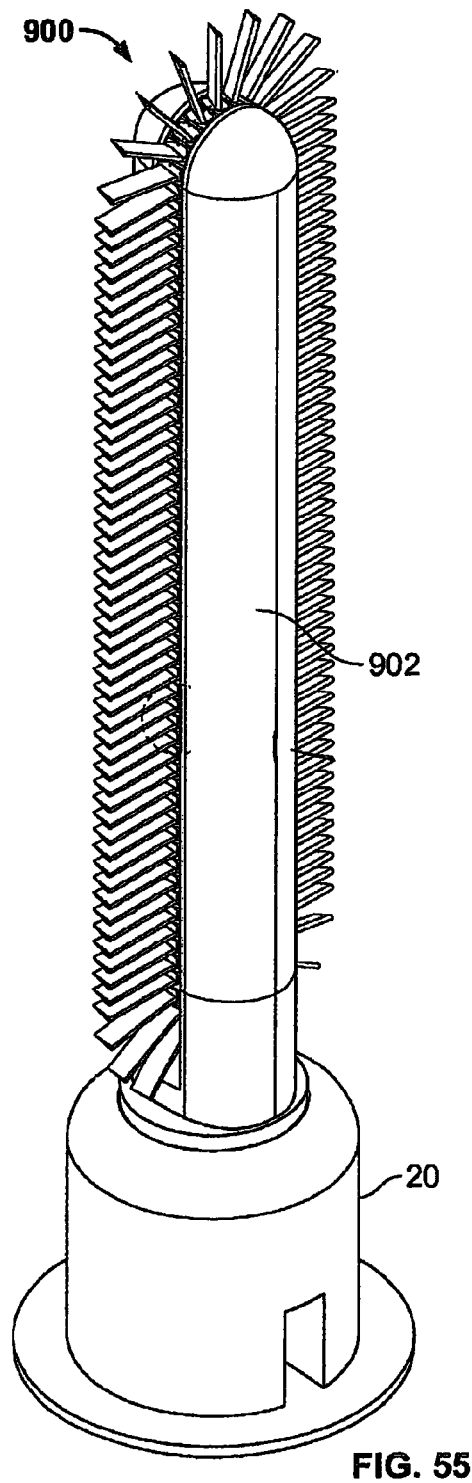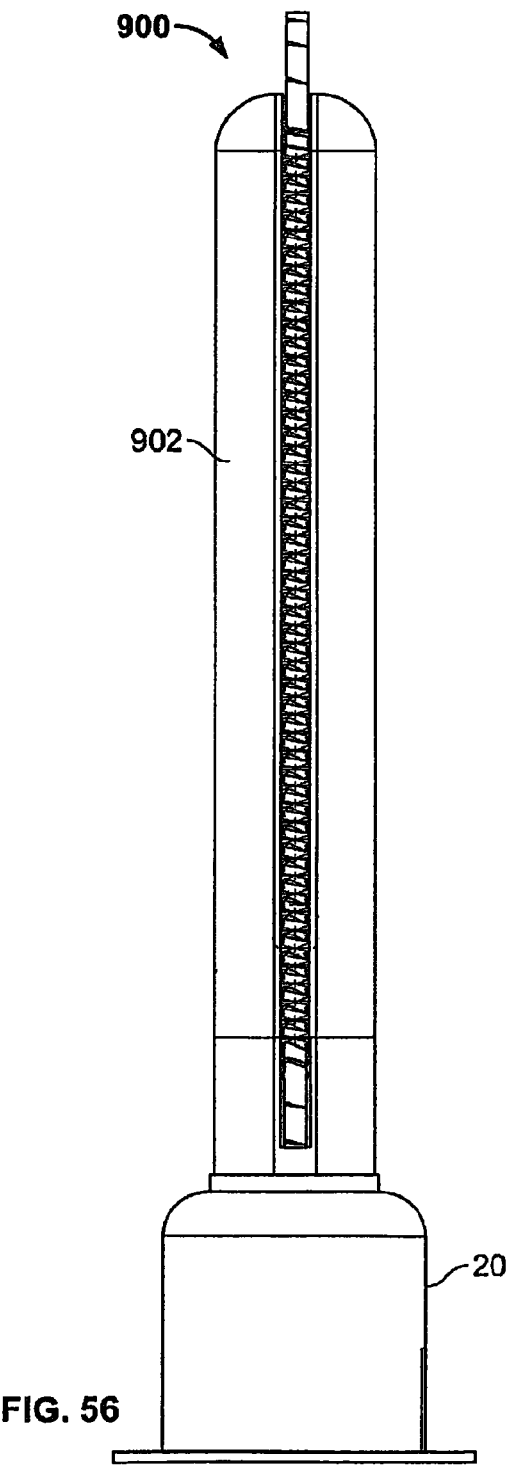
FIG. 55
FIG. 56

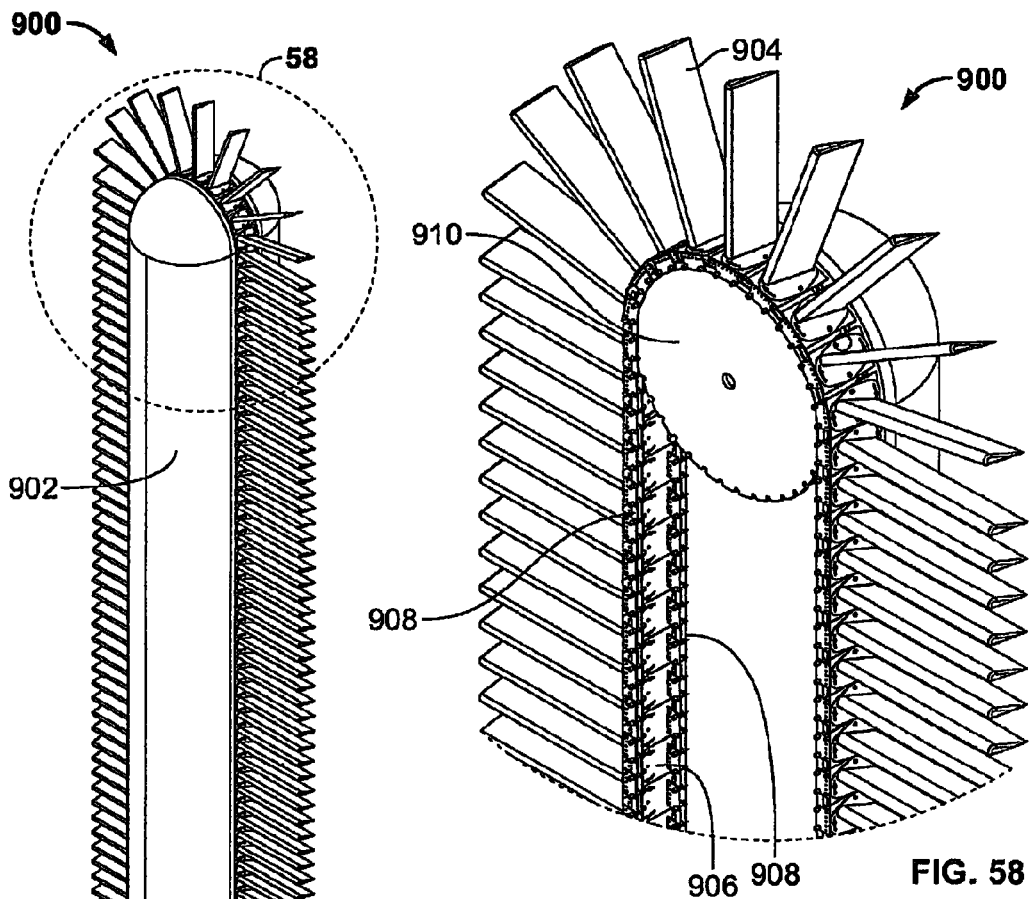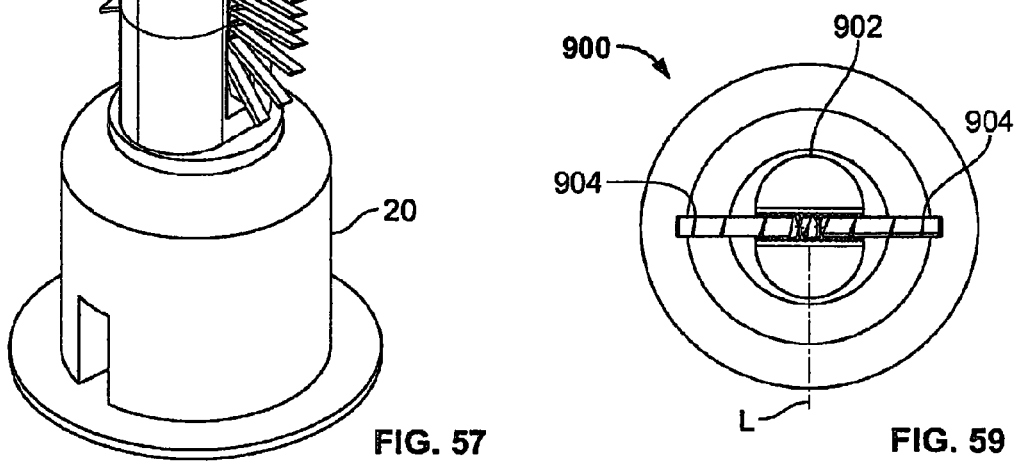
FIG. 57  FIG. 58  FIG. 59

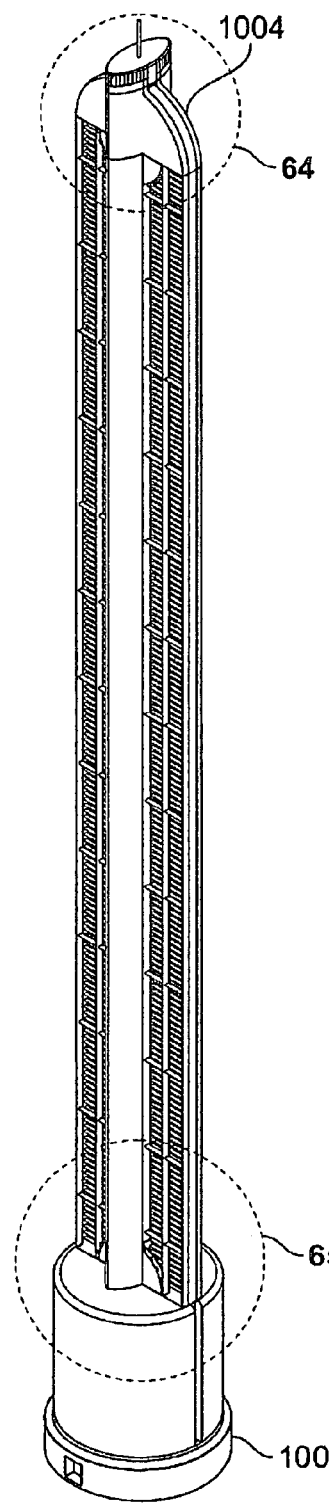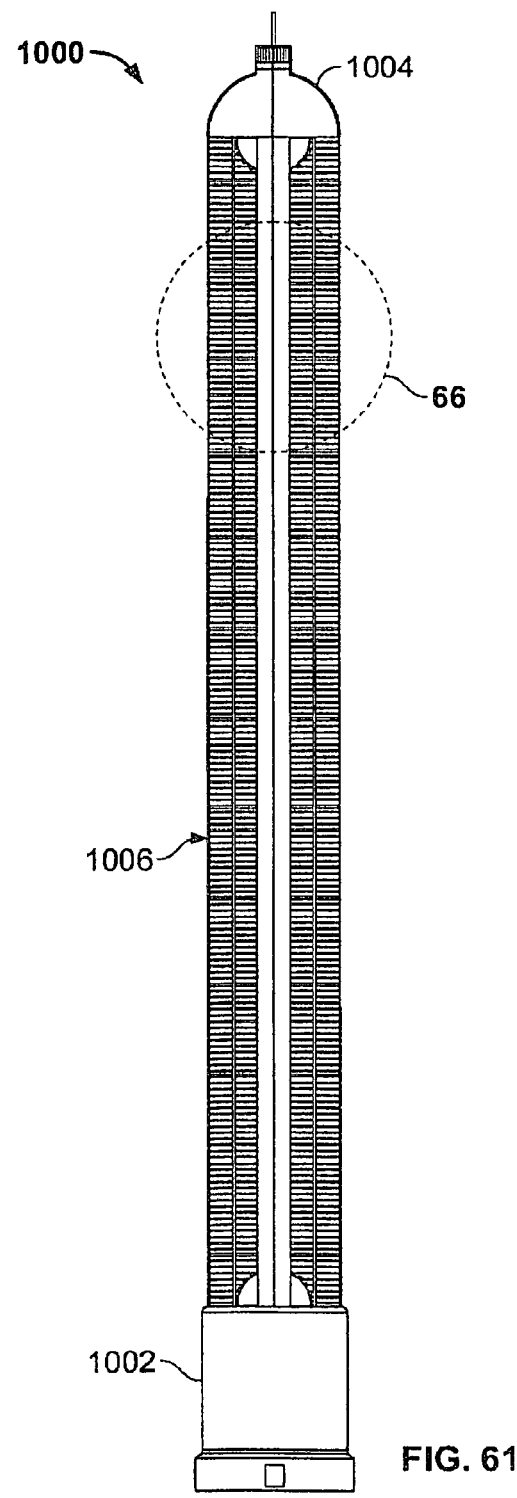
FIG. 60
FIG. 61

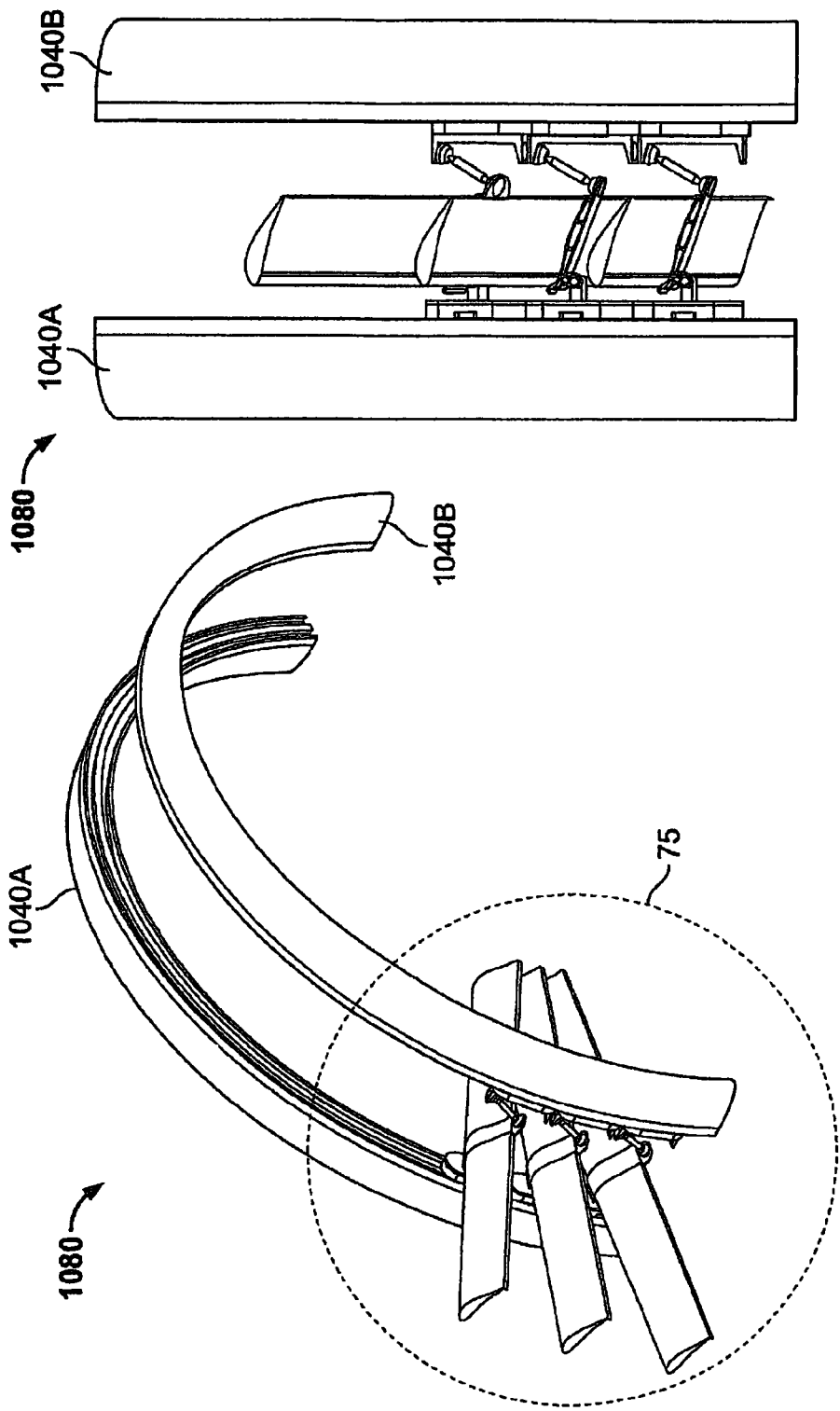

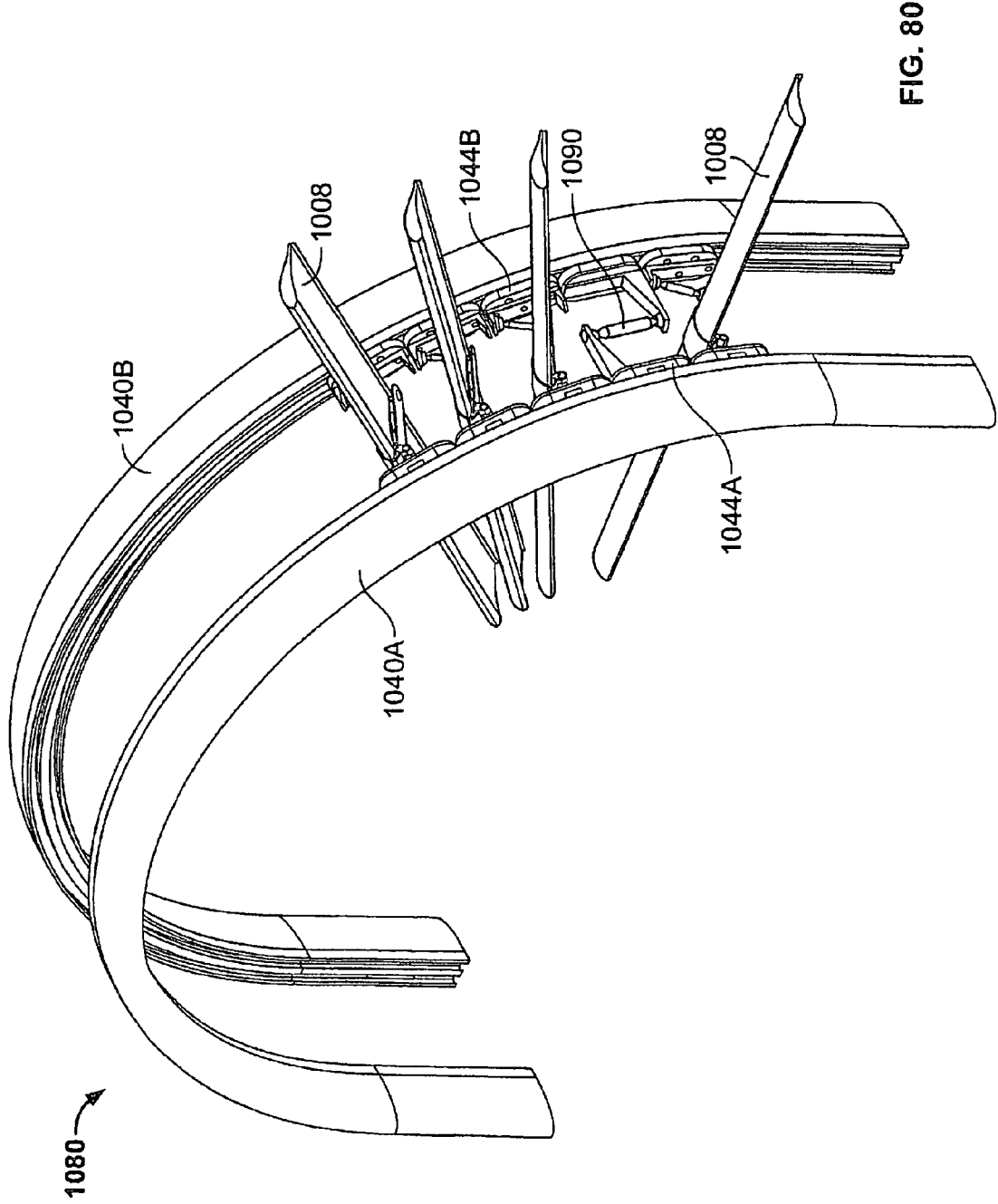

LINEAR WIND POWERED ELECTRICAL GENERATOR

FIELD

The present teachings generally pertain to an energy generation system and related methods. More particularly, the present teachings pertain to a system for generating electricity from a renewal source in which the system includes a fluid amplifying surface.

BACKGROUND

The statements in this section merely provide background information related to the present disclosure and may not constitute prior art.

Various arrangements have been proposed for generating electricity from renewable resources. Many such arrangements are directed to generation of electricity from wind energy. One particular arrangement is shown and described in U.S. Pat. No. 5,520,505 (the '505 patent). The '505 patent discloses an energy conversion device which comprises a stacked array of alternating yawable and fixed toroids having typically four impact impellers mounted in their peripheral flow regions for purposes of capturing energy flow. The fixed toroids are mounted to complement and further enhance fluid flow impact impeller energy capture. U.S. Pat. No. 5,520,505 is incorporated by reference as if fully set forth herein.

While various arrangements are known for the generation of electric energy from renewable sources such as wind, there remains a continuous need for improvement in the relevant art.

SUMMARY

According to one particular aspect, the present teachings provide an energy generation system including an inner tower, an outer shell and a plurality of wind turbines. The outer shell defines a wind amplifying surface. The plurality of wind turbines is carried by the outer shell and disposed relative to the wind amplifying surface to harness wind deflected by the wind amplifying surface.

According to another particular aspect, the present teachings provide a building for generating electricity from a source of wind having a prevailing direction. The building includes an exterior surfaced defining a wind amplifying surface. The building further includes at least first and second turbines disposed on opposite sides of an imaginary line bisecting the wind amplifying surface.

According to yet another particular aspect, the present teachings provide a method of generating electrical energy from wind. The method includes providing a structure defining a wind amplifying surface and substantially orienting the wind amplifying surface in a predetermined orientation relative to a wind direction. The method additionally includes providing at least first and second turbines, the first and second turbines carried relative to the structure and disposed on opposite sides of an imaginary line bisecting the structure and generally parallel to the wind direction. The method further includes deflecting wind by the wind amplifying surface and directing the deflected wind to the first and second turbines.

According to still yet another particular aspect, the present teachings provide an energy generation system including at least one upper sprocket wheel and at least one lower sprocket wheel. The energy generation system additionally includes a continuous drive member interconnecting the at least one upper sprocket wheel and the at least one lower sprocket wheel. The energy generation system further includes a plurality of blades extending from the continuous drive member.

In still yet another aspect, the present teachings provide an energy generation system for generating energy from wind including a plurality of blades. Each blade of the plurality of blades is associated with a guide block. The system additionally include a track for guiding each of the blades of the plurality of blades along a continuous path. The track defines a channel for receiving the guide blocks. The system further includes means for converting motion of the guide blocks along the continuous path to electrical energy.

Further areas of applicability of the present teachings will become apparent from the description and appended claims provided hereinafter. It should be understood that the detailed description and specific examples, while indicating the various examples of the present teachings, are intended for purposes of illustration only and are not intended to limit the scope of the teachings.

DRAWINGS

The present teachings will become more fully understood from the detailed description, the appended claims and the following drawings. The details of the various embodiments will be understood to be drawn to scale.

FIG. 7 is another side view of the tower of FIG. 5.

FIG. 8 is an enlarged view of the detail of Circle A of FIG. 5.

FIG. 9 is an enlarged view of the detail of Circle B of FIG. 6, illustrating one of the turbines rotated to a horizontal position for maintenance or extreme wind conditions.

FIG. 10 is an enlarged view of the detail of Circle C of FIG. 5, illustrating one of the turbines rotated to a horizontal position for maintenance or extreme wind conditions.

FIG. 11 is a simplified top view of the tower of FIG. 5 illustrating air flow past the tower.

FIG. 14 is a side view of the high-rise building of FIG. 13.

FIG. 15 is an enlarged view of the detail of Circle A of FIG. 13.

FIG. 16 is a simplified top view of the high-rise building of FIG. 13 illustrating air flow past the building.

FIG. 21 is an isometric view of another tower for an energy generation system in accordance with the present teachings.

FIG. 22 is a side view of the tower of FIG. 21.

FIG. 23 is a top view of the tower of FIG. 21.

FIG. 24 is another perspective view of the tower of FIG. 21.

FIG. 28A is a perspective view of a tower segment for a tower of an energy generation system in accordance with the present teachings, the tower segment illustrating two turbines in wind production positions.

FIG. 28B is a top view of the tower segment of FIG. 28A.

FIG. 28C is a side view of the tower segment of FIG. 28A.

FIG. 30A is a perspective view of the tower segment of FIG. 28A, one of the two turbines illustrated in a service position and another of the turbines illustrated being moved to the service position.

FIG. 30B is a top view of the tower segment of FIG. 30A.

FIG. 30C is a side view of the tower segment of FIG. 30A.

FIG. 30D is an enlarged view of the detail of Circle 30D of FIG. 30A.

FIG. 37 is an end view of the rail system of FIG. 35.

FIG. 38 is an enlarged view of the detail of circle 38 of FIG. 35.

FIG. 39 is a perspective view of another rail system constructed in accordance with the present teachings.

FIG. 42 is an isometric view of another tower for an energy generation system in accordance with the present teachings.

FIG. 43 is a side view of the tower of FIG. 42.

FIG. 44 is another side view of the tower of FIG. 42.

FIG. 45 is an enlarged view of the detail of Circle 45 of FIG. 42.

FIG. 55 is an isometric side view of the tower of FIG. 54.

FIG. 56 is another side view of the tower of FIG. 54.

FIG. 57 is another isometric view of the tower of FIG. 54.

FIG. 58 is an enlarged view of the detail of Circle 58 of FIG. 57 shown partially cut-away.

FIG. 59 is a top view of the tower of FIG. 54.

FIG. 60 is a perspective view of another tower for an energy generation system in accordance with the present teachings.

FIG. 61 is a front view of the tower of FIG. 60.

Figure 66:
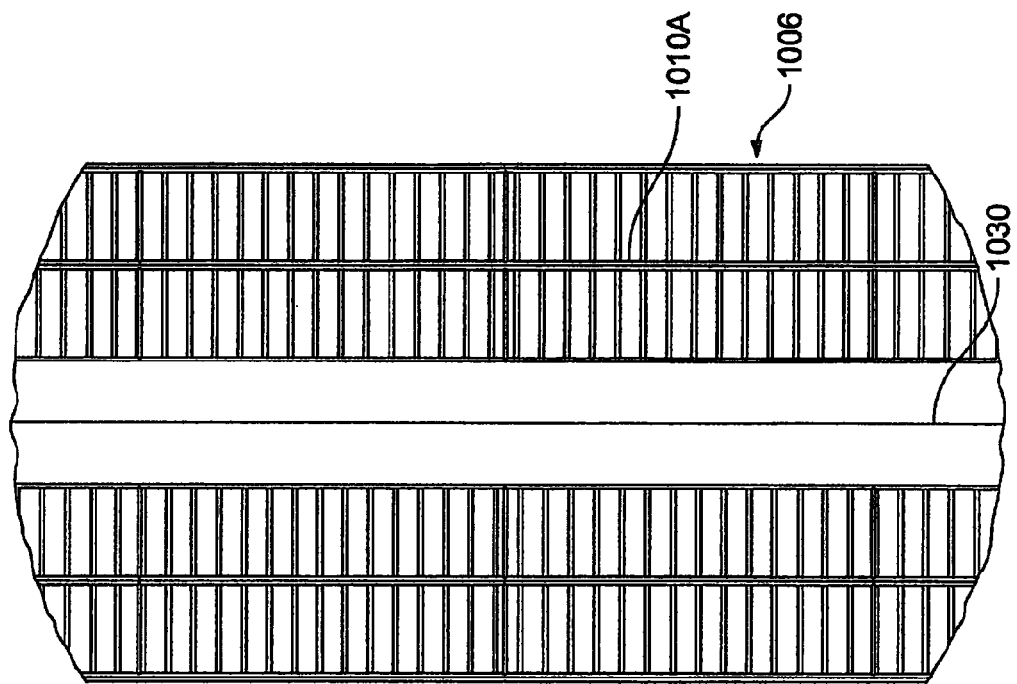
Figure 65:
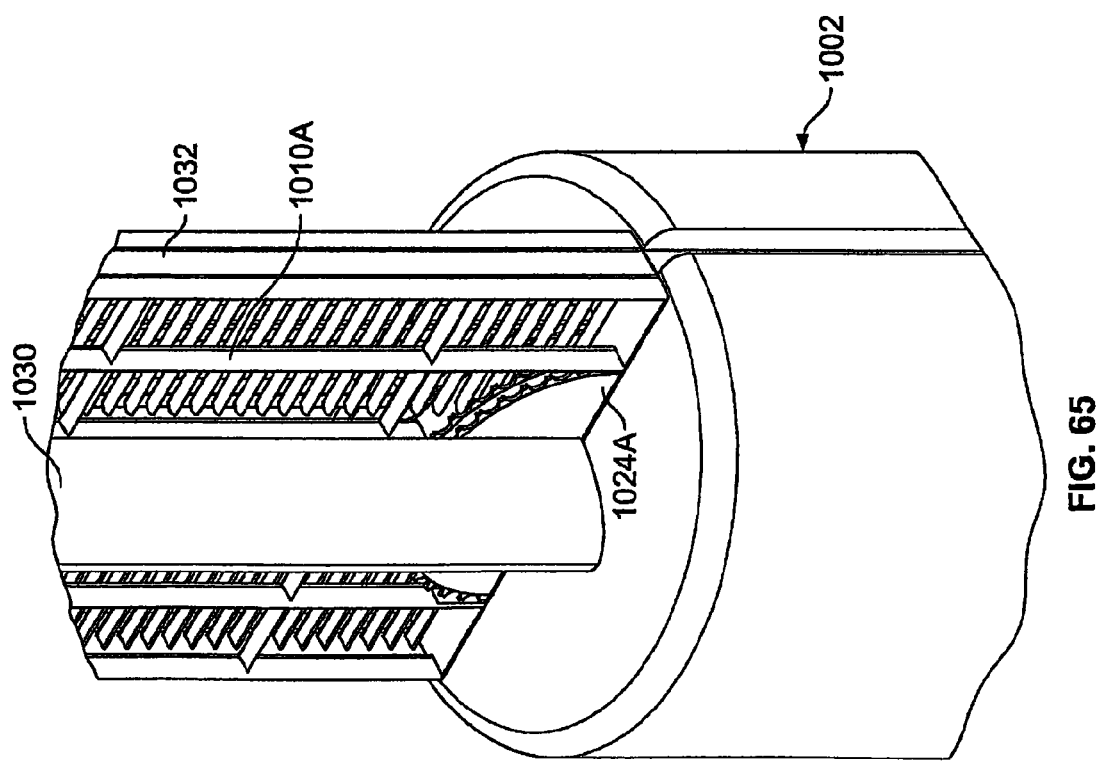
FIG. 65 is an enlarged view of the detail shown in Circle 65 of FIG. 60.

FIG. 66 an enlarged view of the detail shown in Circle 66 of FIG. 61.

Figure 67:
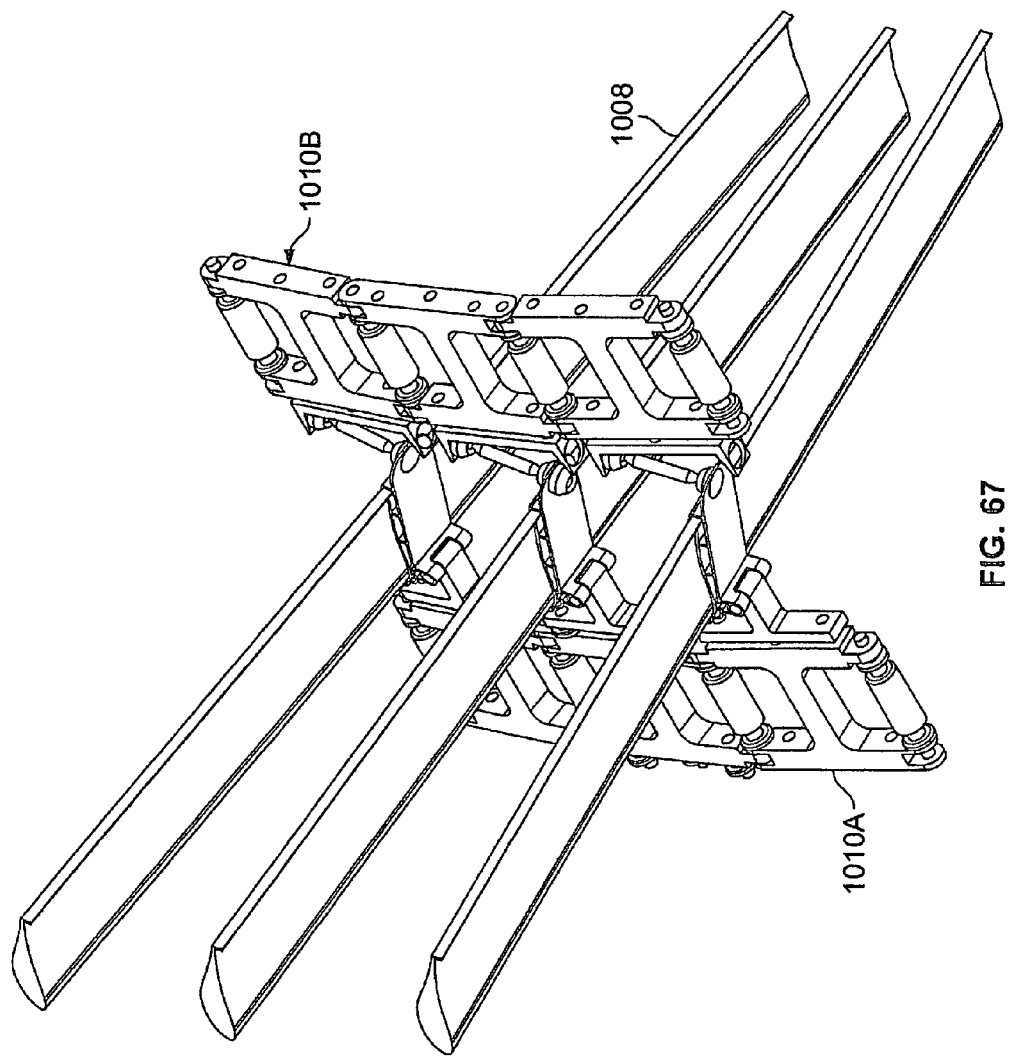

FIG. 67 is an enlarged perspective view of a portion of the tower of FIG. 60 illustrating the interconnection between first and second chains and a plurality of blades.

Figure 68:
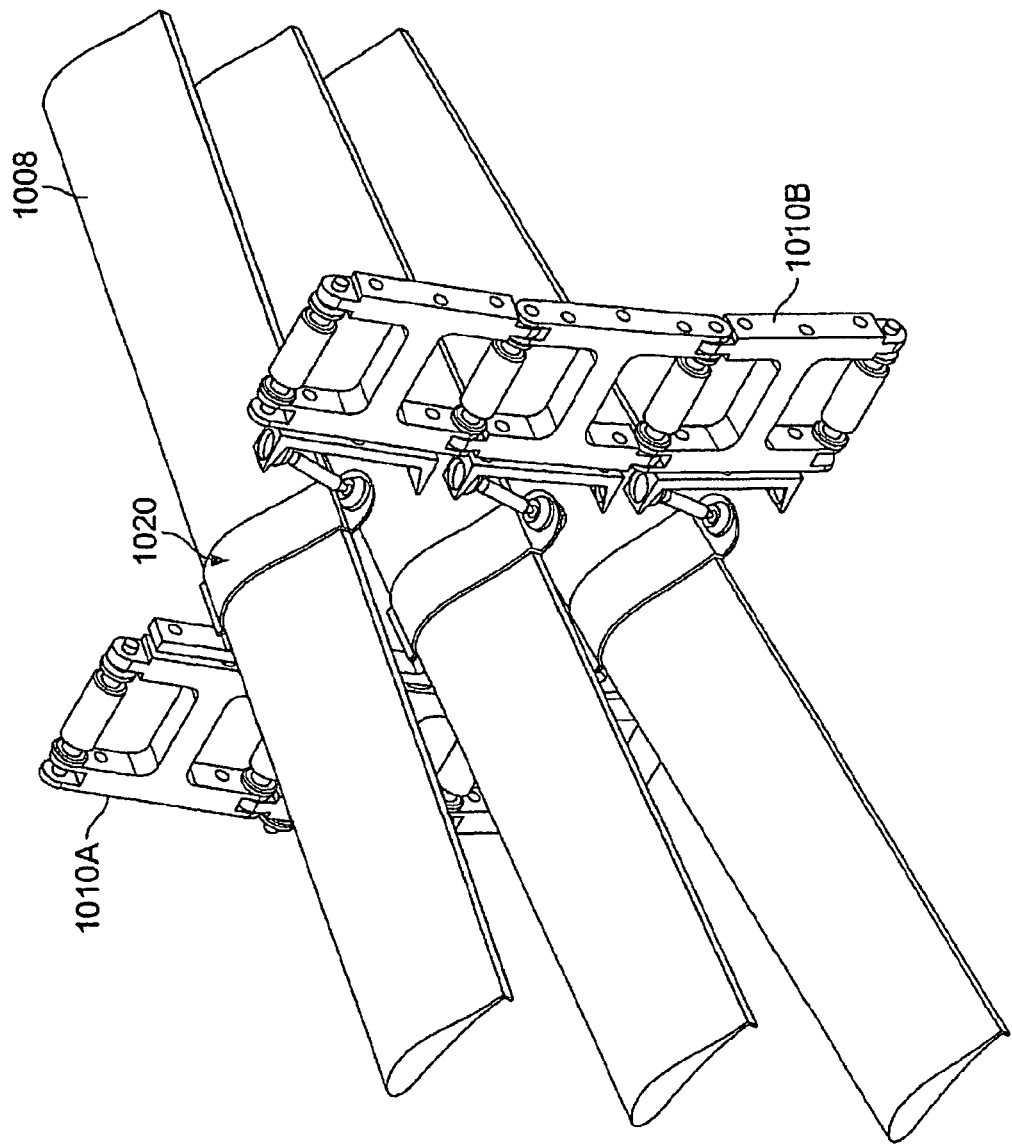

FIG. 68 is another view of the portion of the tower shown in FIG. 67.

Figure 69:
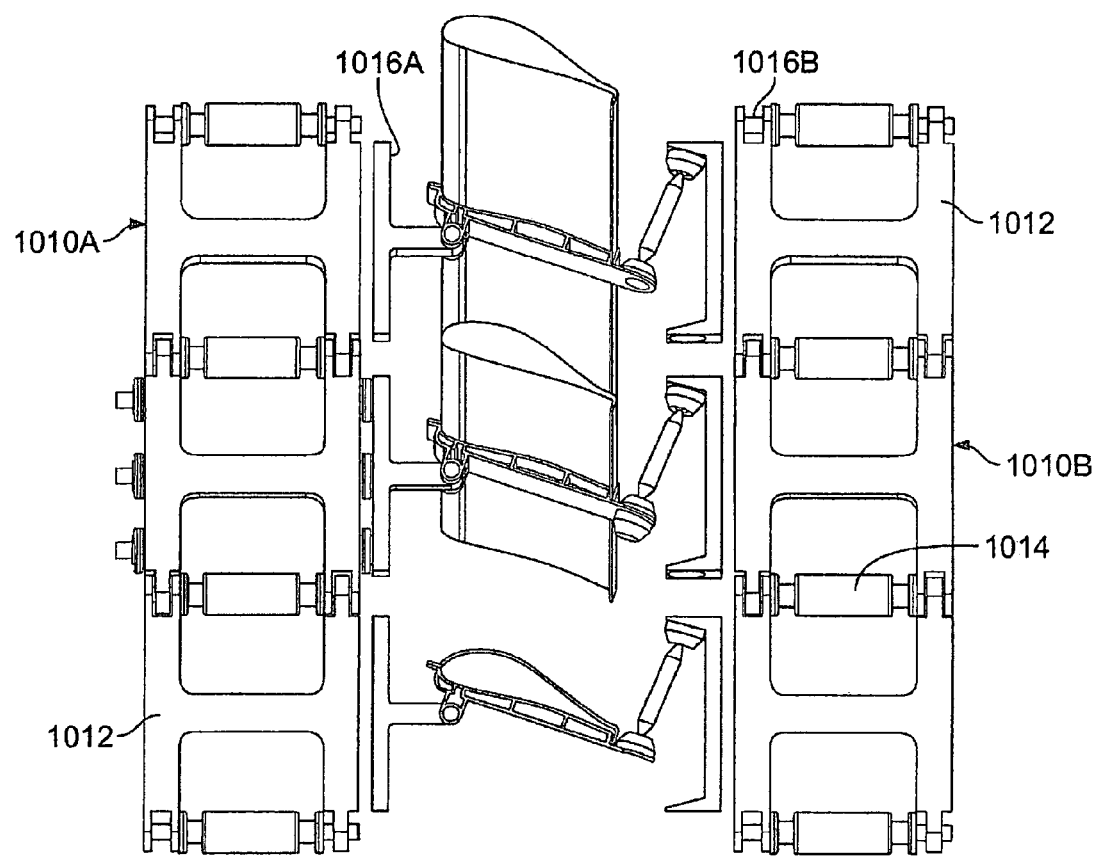

FIG. 69 is another view of the portion of the tower shown in FIG. 68.

Figure 70:
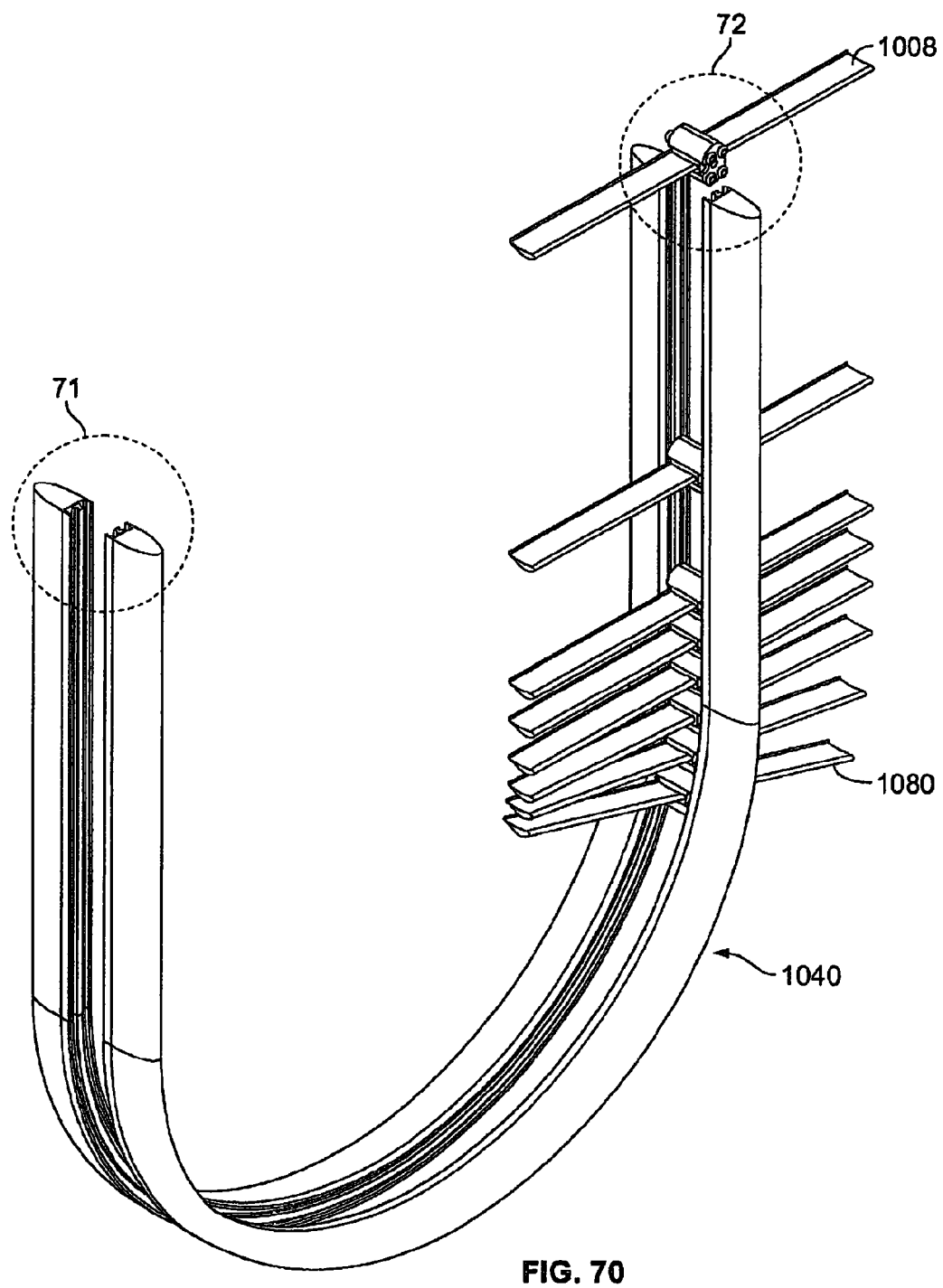

FIG. 70 is a perspective view of a portion of an alternative arrangement for interconnecting the blades of the tower of FIG. 60.

Figure 71:
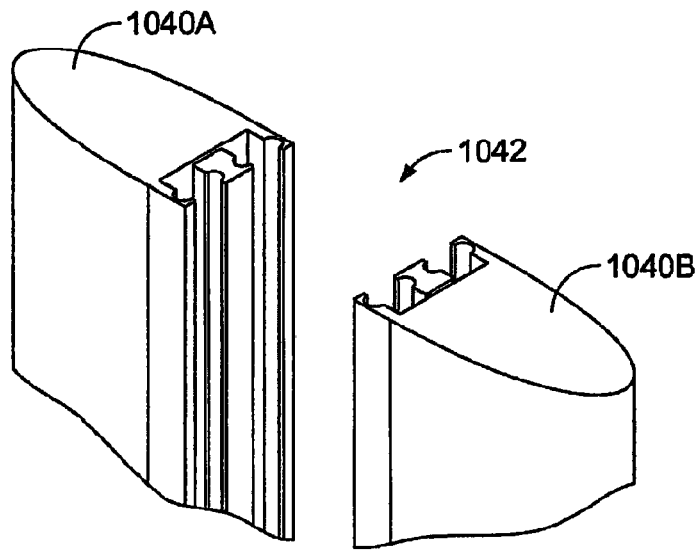

FIG. 71 is an enlarged view of the detail shown in Circle 71 of FIG. 70.

Figure 72:
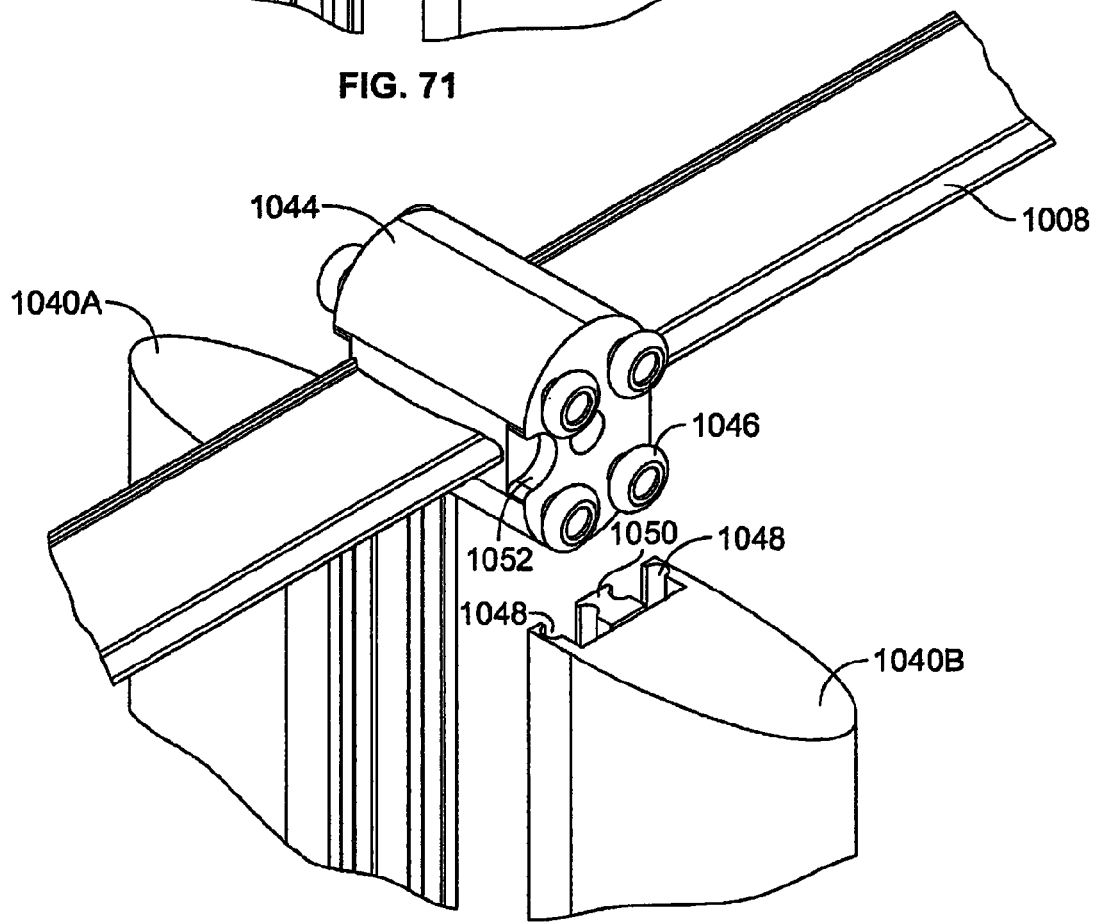

FIG. 72 is an enlarged view of the detail shown in Circle 72 of FIG. 70.

FIG. 73 is a perspective view of another alternative arrangement for interconnecting the blades of the tower of FIG. 60.

FIG. 74 is a side view of the arrangement of FIG. 73.

Figure 75:
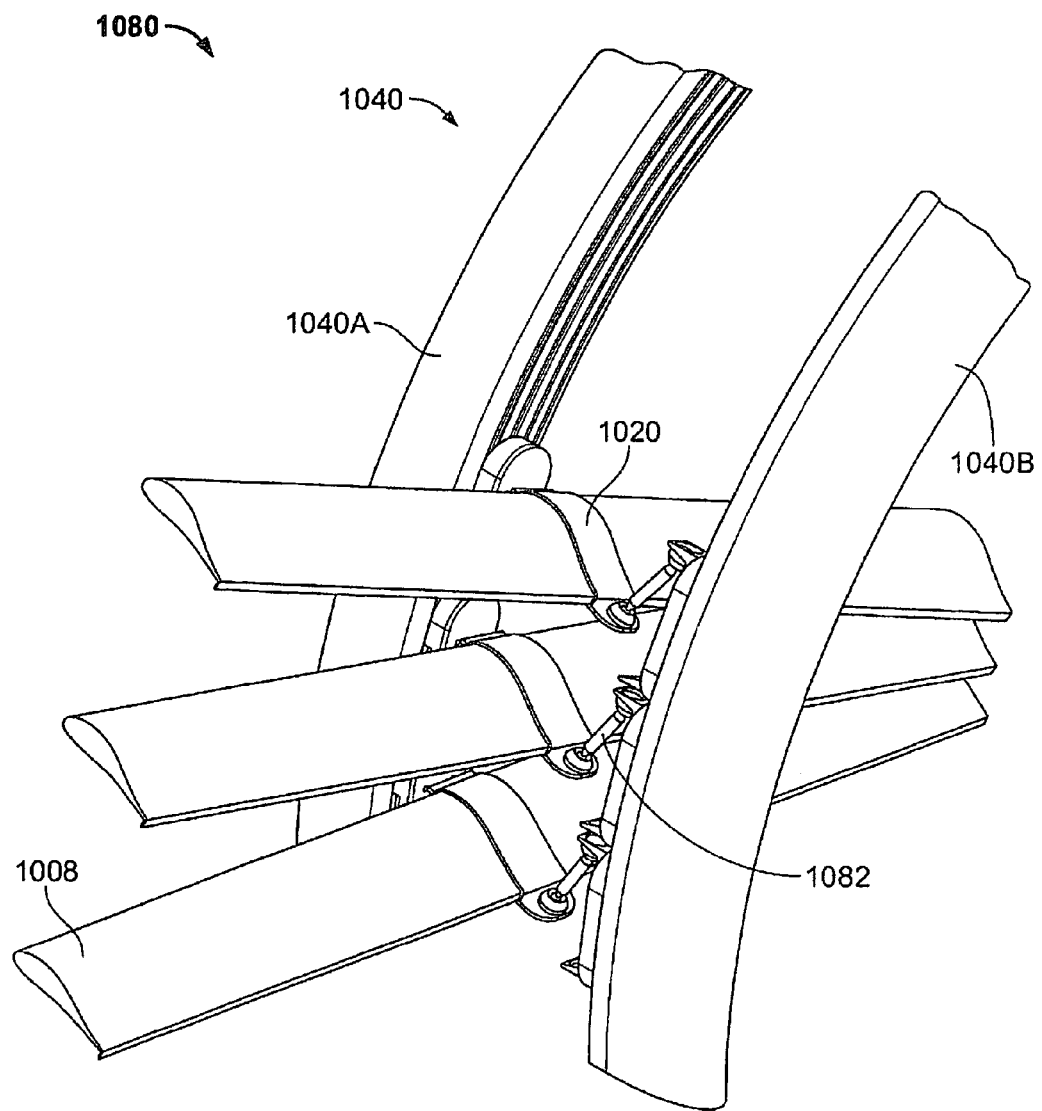

FIG. 75 is an enlarged view of the detail shown in Circle 75 of FIG. 73.

Figure 76:
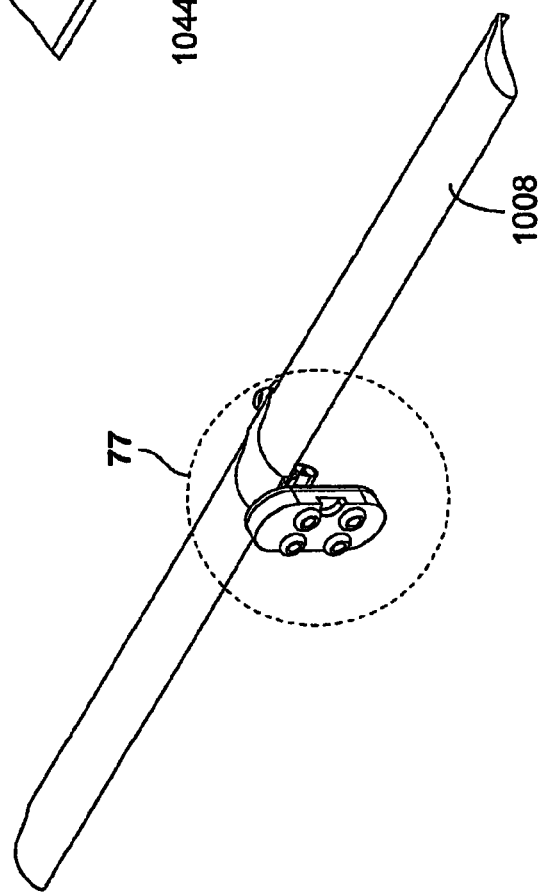

FIG. 76 is a perspective view of one of the blades of the arrangement of FIG. 73 with a first guide block for slidably interconnecting the blade with the front guide rail.

Figure 77:
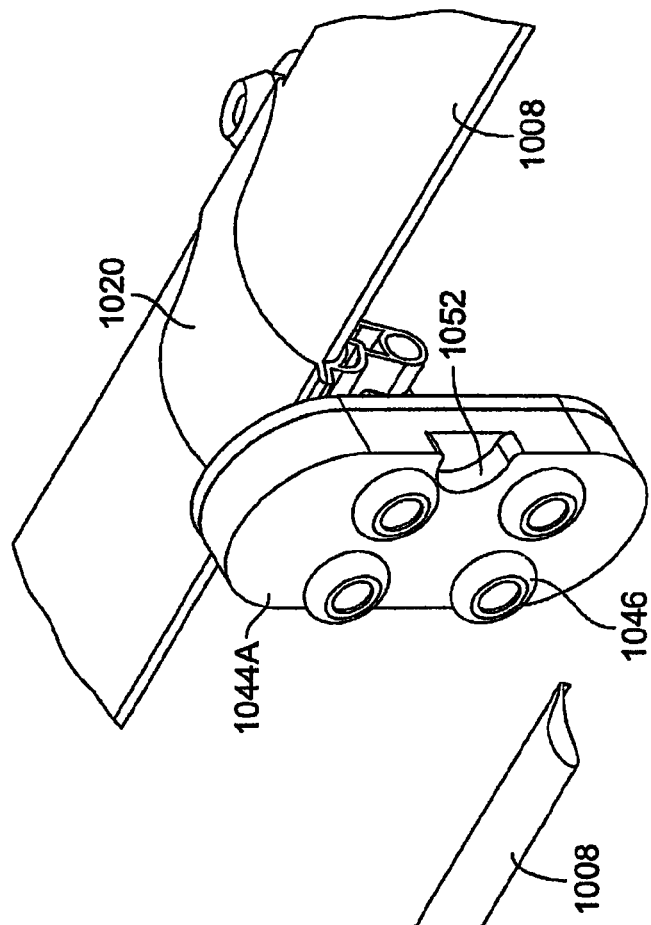

FIG. 77 is an enlarged view of the detail shown in Circle 77 of FIG. 76.

Figure 78:
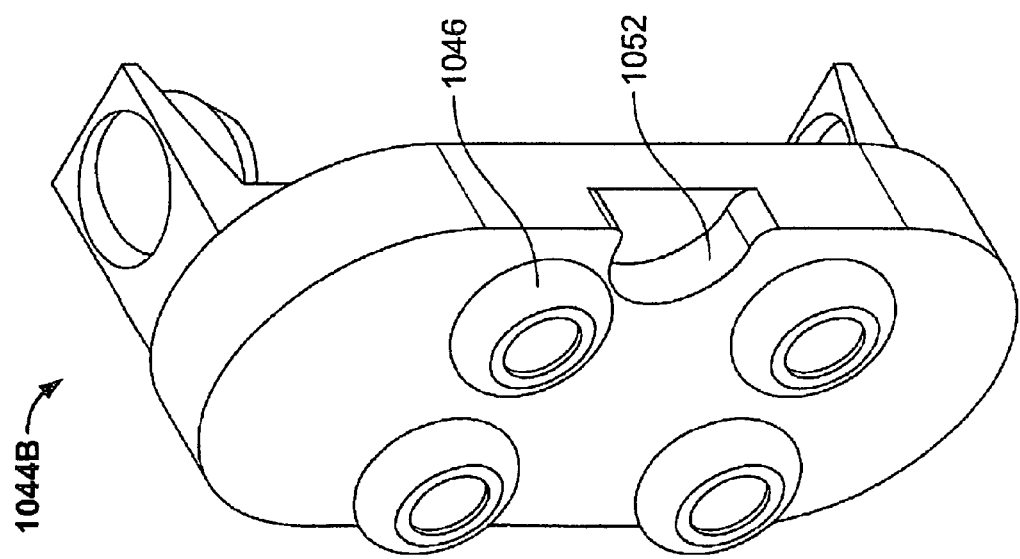

FIG. 78 is a perspective view of a second guide block for slidably interconnecting a blade with a rear guide rail.

Figure 79:
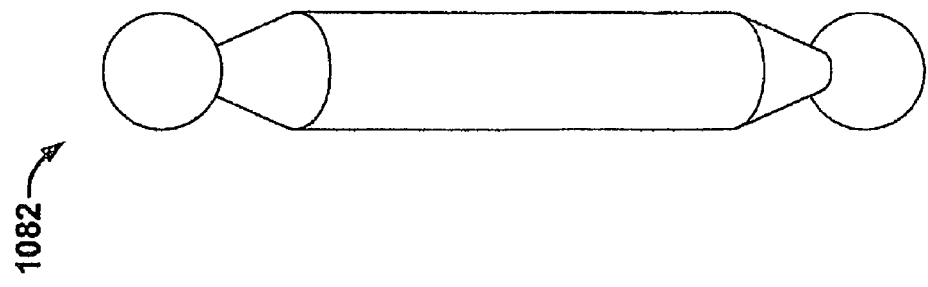

FIG. 79 is a side view of an intermediate arm of the arrangement of FIG. 73.

FIG. 80 is another perspective view of the arrangement of FIG. 73.

DESCRIPTION OF VARIOUS ASPECTS

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

With initial reference to FIGS. 1 through 4, a tower for an energy generation system in accordance with the present teachings is illustrated an identified at reference character 10. The tower 10 is illustrated to generally include an inner tower 12, an outer shell or outer tower 14 and a plurality of turbines 16. The inner tower 12 may include a base 20 mounted to a foundation (see, FIG. 19). The base 20 may support the tower 10 in a conventional manner. While not particularly illustrated with respect to the embodiment of FIGS. 1 though 4, it will be understood that an upwardly extending tube of the inner tower 12 may be hollow and may house storage tanks for compressed air, pneumatic motors to convert compressed air into electricity and other conventional components for converting wind energy to electricity. To the extent not otherwise described herein, these items housed within the inner tower 12 will be understood to be conventional in both construction and operation. An upper portion of the inner tower 12 may be used as a transmission tower and observatory.

The outer shell 14 may be concentrically arranged relative to the inner tower 12. The outer shell 14 may be rotatable coupled to the inner tower 12. Explaining further, the outer shell 14 may rotate bi-directionally relative to the inner tower 12 as illustrated by double arrow A in FIG. 3.

A supporting ring 22 may provide a bearing between the inner tower 12 and the outer shell 14. A similar bearing (not particularly illustrated) may be incorporated at a lower end of the tower 10 between the inner tower 12 and the outer shell 14. While not illustrated, it will be understood that outer shell 14 may be driven relative to the tower 12 by a motor. The motor may be operated by command or may be automatically responsive to predetermined wind conditions. The particular positioning of the outer shell 14 relative to the inner tower 12 will be discussed further below. An arrangement for rotatably coupling the inner tower 12 and outer shell 14 is described further below with respect to FIG. 19.

Figures 33, 34:
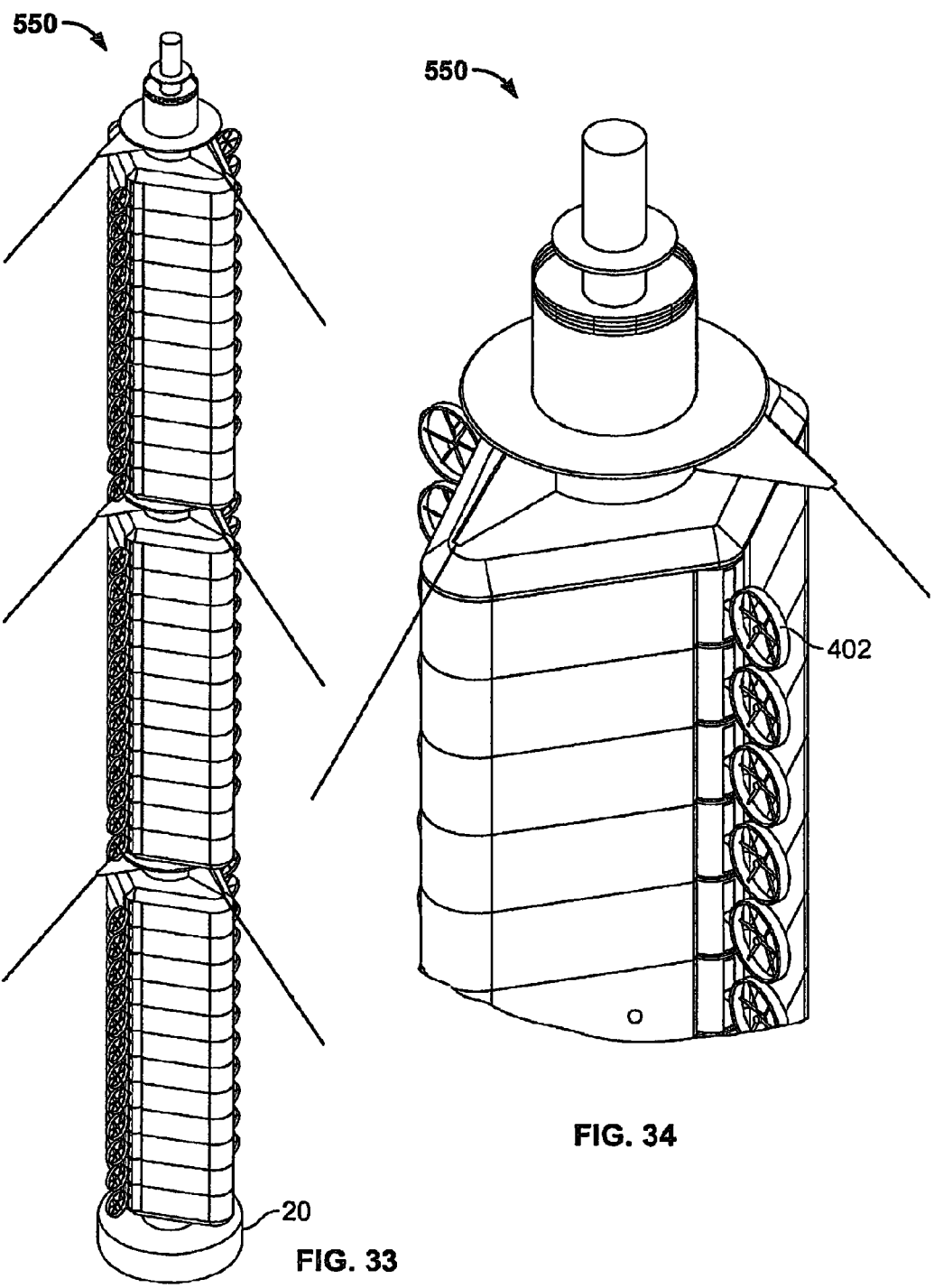
FIG. 33 is another perspective view of the tower of FIG. 31.
FIG. 34 is an enlarged view of the detail of circle 34 of FIG. 32.
Figure 35:
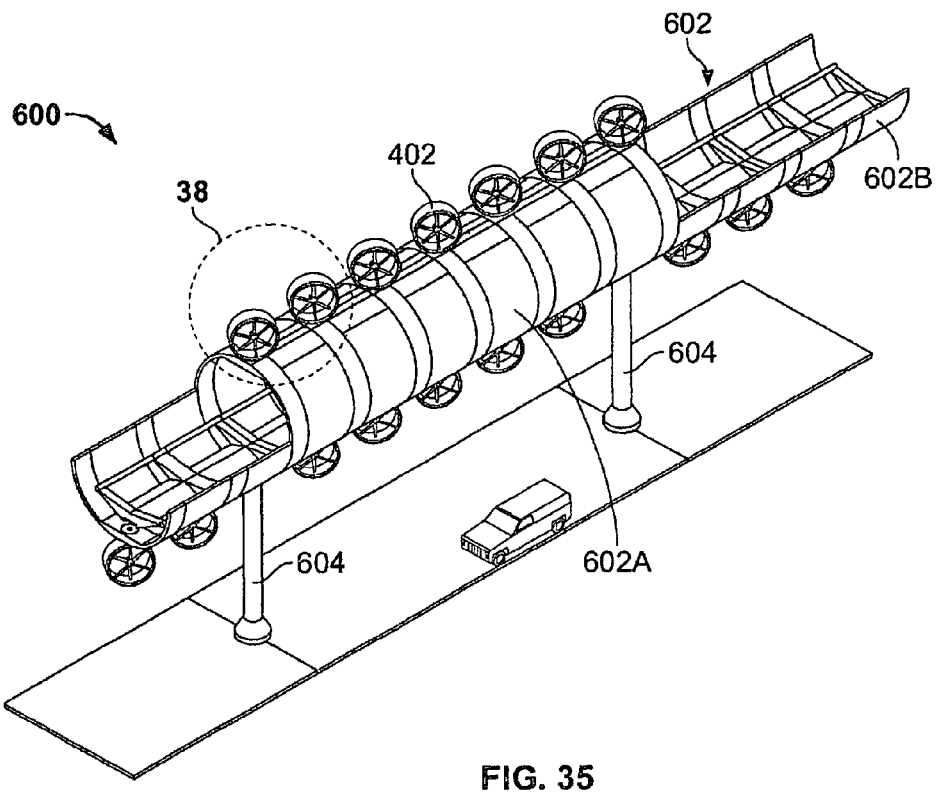
FIG. 35 is a perspective view of a rail system constructed in accordance with the present teachings.
Figure 36:
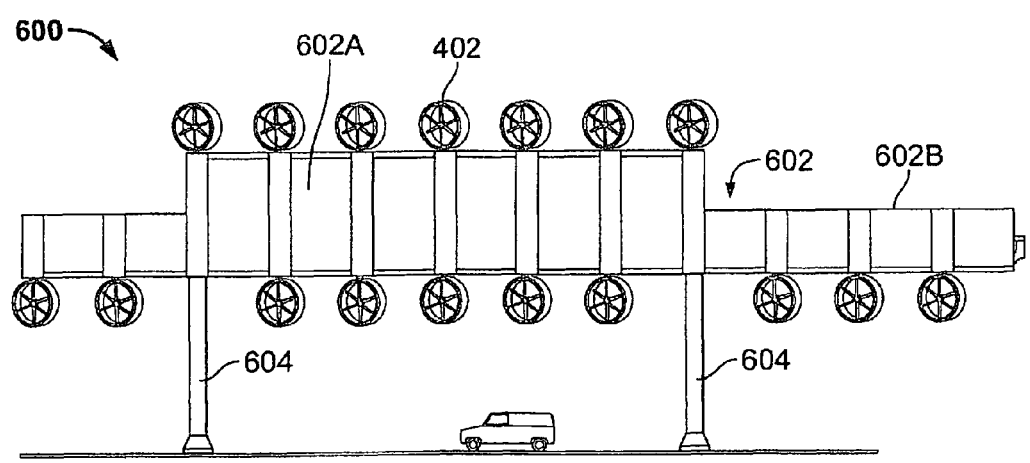
FIG. 36 is a side view of the rail system of FIG. 35.

As will be appreciated more fully below, the outer shell 14 may include an outer surface or a fluid amplifying surface. In the particular embodiment illustrating, the present teachings are particular intended to amplify wind. Certain of the present teachings relative to this embodiment and the other embodiments described herein, however, may have application for the amplification of other fluids such as water. Further in the embodiment illustrated, the wind amplifying surface may be cylindrical and continuous. Alternatively, the wind amplifying surface may be in the shape of an airfoil or may be of other configuration, including but not limited to the configuration shown in FIG. 34.

Figure 1:
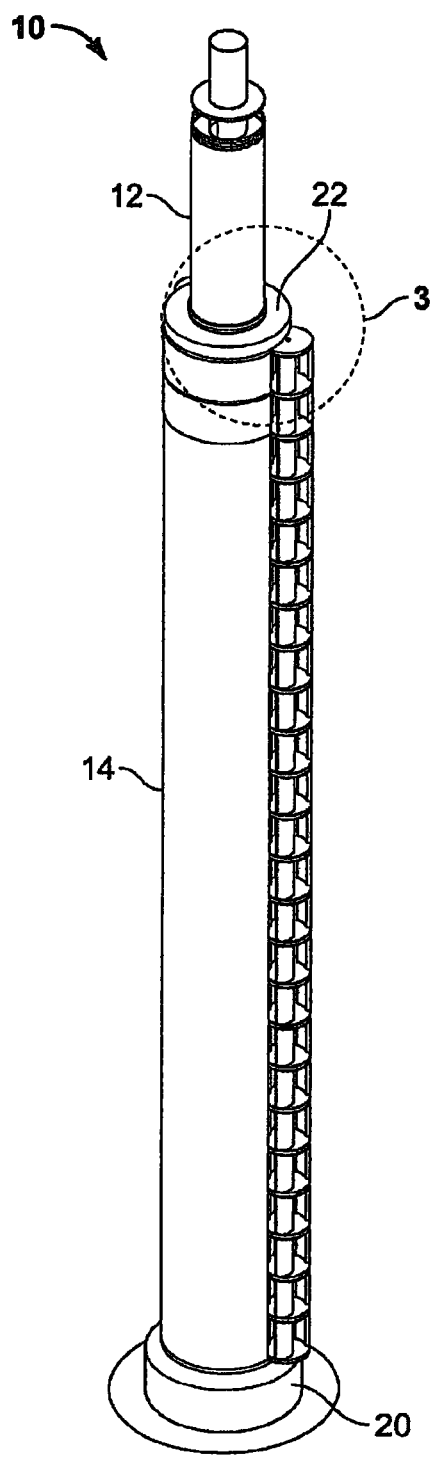
FIG. 1 is an isometric view of a tower for an energy generation system in accordance with the present teachings.
Figure 2:
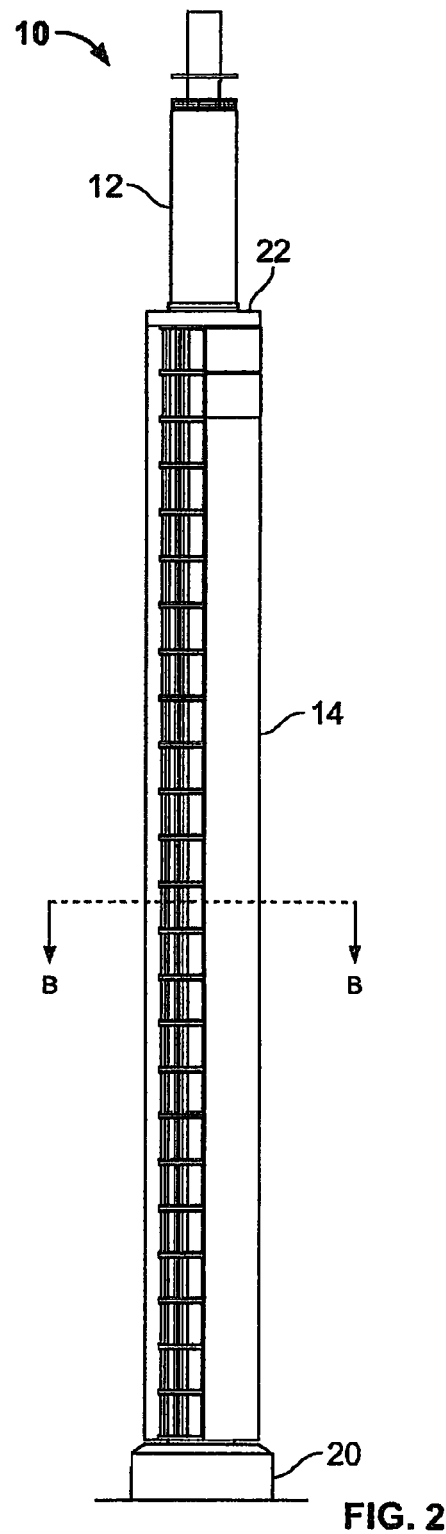
FIG. 2 is a side view of the tower of FIG. 1.
Figure 3:
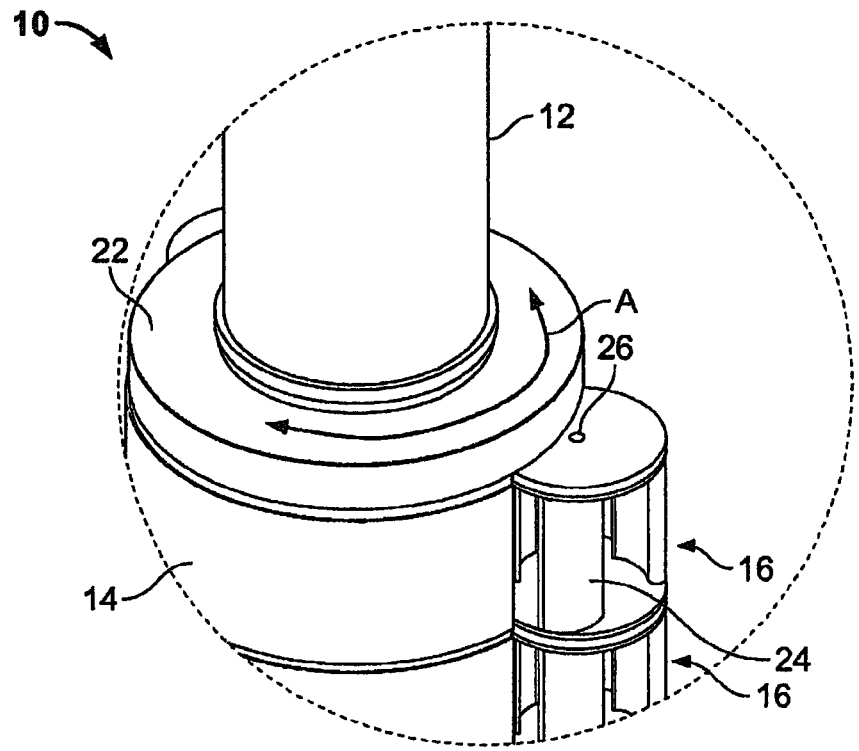
FIG. 3 is an enlarged view of the detail of Circle C of FIG. 1.

The outer shell 14 may be comprised of a plurality of stackable units. The stackable units provide certain design and assembly advantages. Alternatively, the outer shell may be designed as a single piece. As illustrated in FIGS. 1 and 2, the tower 10 may include 24 stackable units. Alternatively, a greater or lesser number of stackable units may be used depending on power requirements and the location of the tower 10. In one particular application, the outer shell 14 may have a height of approximately eighty-six meters and a diameter of approximately 11 meters.

Each stackable unit of the tower 12 may include one or more turbines 16. As illustrated, each stackable unit may be associated with a plurality of turbines 16. More particularly, each stackable unit may be associated with a pair of turbines 16.

As illustrated, the turbines 16 may be vertically oriented turbine axles 16. The turbines 16 may be attached to the rotating outer shell 14 with platforms. The turbines 16 may conventionally include a plurality of blades 24. The blades 24 may rotate about a vertical axis 26 of the respective turbines 16.

Figure 4:
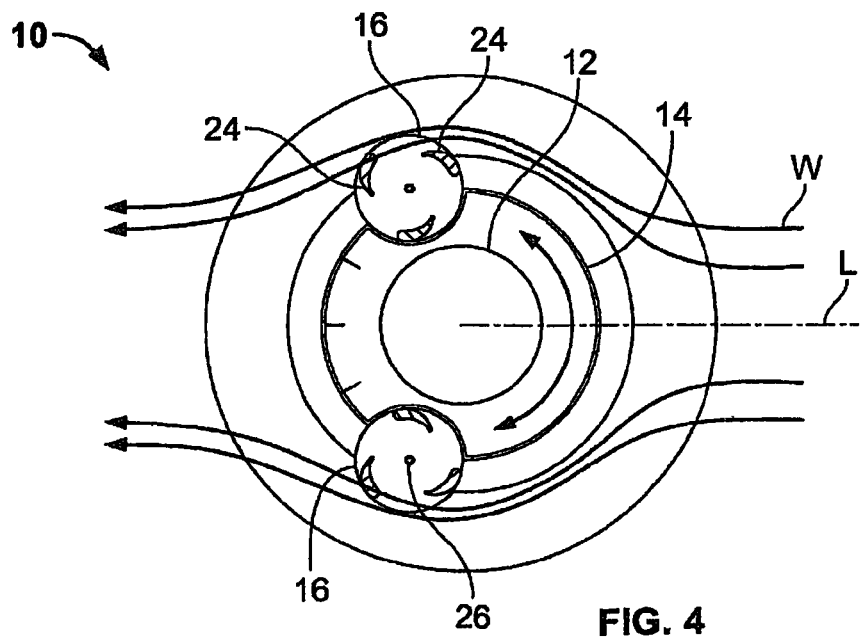
FIG. 4 is a simplified cross-sectional view taken along the line B-B of FIG. 1 and illustrating air flow past the tower of FIG. 1.
Figure 5:
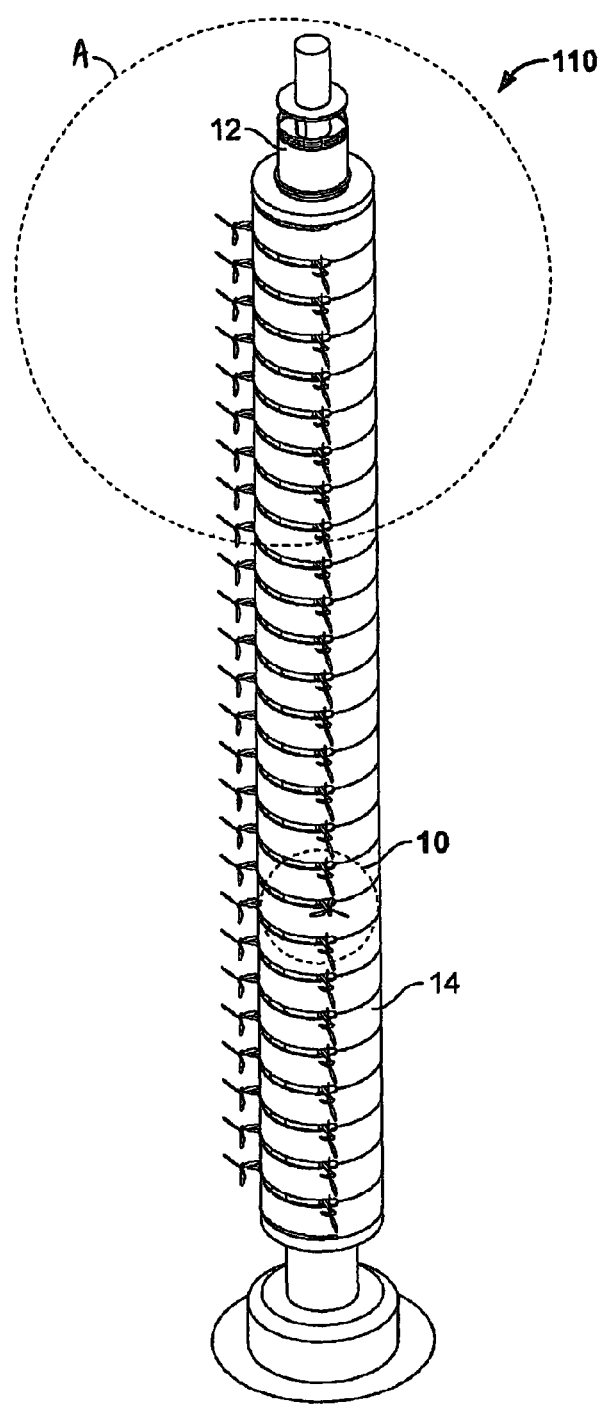
FIG. 5 is an isometric view of another tower for an energy generation system in accordance with the present teachings.
Figure 6:
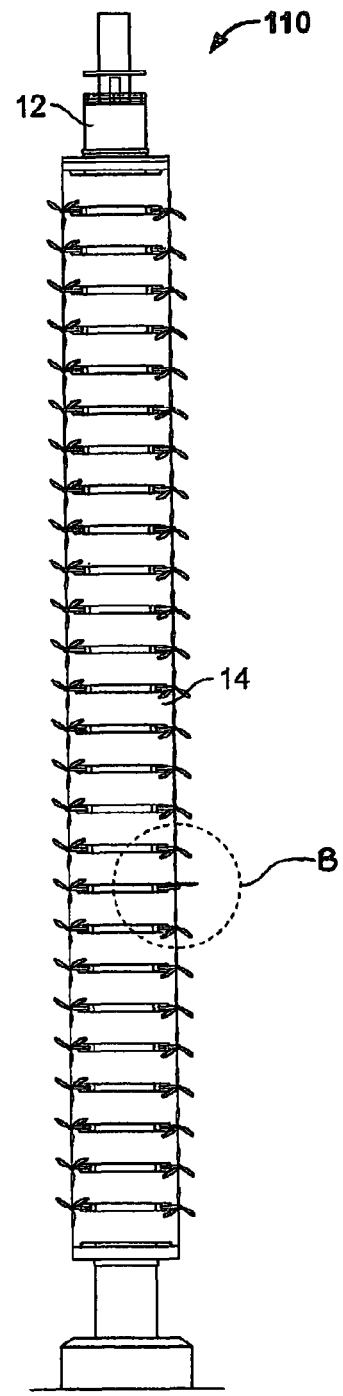
FIG. 6 is a side view of the tower of FIG. 5.

With reference to the cross-sectional view of FIG. 4, the rotation axes 26 of the turbines 16 may be spaced about the outer shell 14. As shown, the spacing between the axes 26 of the turbines 16 may be less than one hundred eighty degrees. In one particular application, the spacing may be about one hundred and sixty degrees. The spacing between the axis, however, may vary within the scope of the present teachings. The spacing may vary depending on wind conditions, the diameter of the tower, etc. In the embodiments illustrated, the turbine supports may swivel horizontally to increase or decrease the separation distance and angle for optimization.

In operation, the outer shell 14 may be rotationally adjusted relative to the inner tower 12 such that the wind direction W is parallel to an imaginary line L bisecting the outer shell 14 and equidistant from the axes 26 of the turbines 16. As such, the blades 24 of the turbines 16 will directly catch the wind. Additionally, wind will be amplified and deflected by the wind amplifying surface of the outer shell 24 and directed to the blades 24 of the turbines 16.

In the embodiment illustrated, each turbine 16 may generate approximately 8 kilowatts of energy. The total power in this example is roughly estimated to theoretically be about 400 kw at wind speeds of 5 m/sec.

Turning to FIGS. 5 through 11, another tower in accordance with the present teachings is illustrated and generally identified at reference character 110. The tower 110 shares various features with the tower 10. As such, like components between the two embodiments are identified in the drawings with like reference characters. To the extent not otherwise described herein, the tower 110 will be constructed similar to the tower 10 and further understood to operate in a manner substantially similar to the tower 10.

The tower 110 primarily differs from the tower 10 by incorporating a plurality of turbines 112 configures to rotate about horizontal axes 114. It will be understood that the construction and operation of the horizontal turbines 112 is conventional insofar as the present teachings are concerned.

Figure 12:
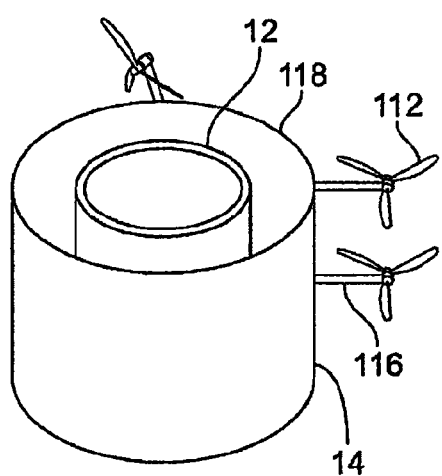
FIG. 12 is a perspective view of one of the stackable segments of the tower of FIG. 5.
Figure 13:
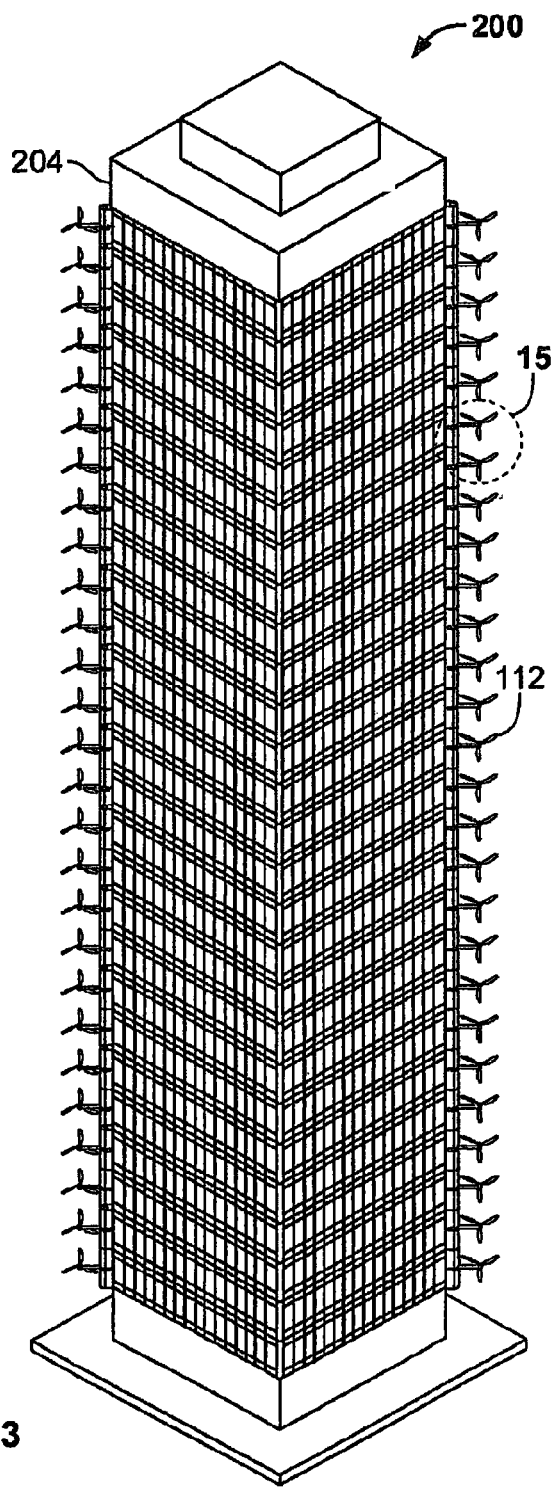
FIG. 13 is an isometric view of a high-rise building incorporating an energy generation system in accordance with the present teachings.
Figure 17:
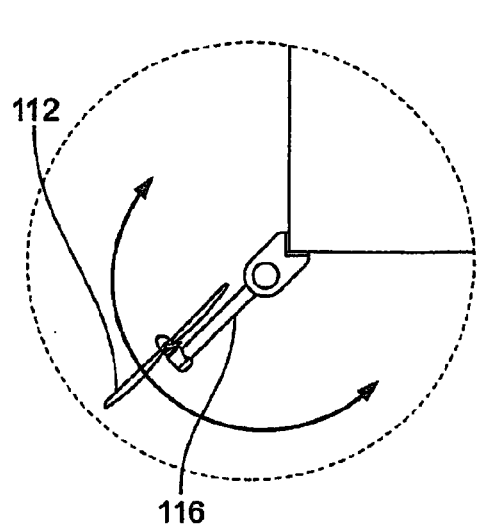
FIG. 17 is enlarged top view of one of the rotors of FIG. 13.

As perhaps most particularly shown in FIG. 12, the turbines may be carried at the end of a horizontal shaft 116 that is carried by a vertical shaft 118. The horizontal shaft 116 may be disposed within the outer shell 14.

With reference to FIGS. 9 and 10, the horizontal shafts 116 may be rotated about their axes to orient the blades of the turbines 112 in a horizontal plane. In this orientation, the turbines 112 may be retracted within the outer shell 14 through a circumferential opening 120 for maintenance. This orientation of the turbines 112 may also be useful during periods of extreme wind speed.

Turning now to FIGS. 13 through 17, a high-rise building 200 incorporating an energy generation system 202 in accordance with the present teachings is illustrated. Like components between the system 202 and the embodiments described above are identified in the drawings with like reference characters. To the extent not otherwise described herein, the high-rise building 200 will be understood to be constructed to include a system 202 similar to the tower 110. Alternatively, the present teachings may be adapted to existing buildings. In this regard, the building 200 includes a plurality of horizontally oriented turbines 112. Alternatively, the building 200 may incorporate a plurality of vertically oriented turbines 16 similar to those described above in connection with the tower 10.

In the embodiment illustrated, the exterior of the building defines the wind amplifying surface 204 of the energy generation system 202. The wind amplifying surface 204 may be a polygon. More particularly, the wind amplifying surface 204 may be rectangular. Alternatively, the wind amplifying surface 204 may be a curved surface. Even more particularly, the wind amplifying surface 204 may be square. Alternatively, the wind amplifying surface maybe cylindrical, in the shape of an air foil or of any other suitable shape.

The building 200 may be positioned such that the prevailing wind impinges a corner 208. The wind turbines 112 may be carried at adjacent corners 210 of the building 200. In such an orientation, an imaginary line L may bisect the building 200 and be equidistant from the axes 26 of the turbines 16. As such, the blades 24 of the turbines 16 will directly catch the wind. Additionally, wind will be amplified and deflected by the wind amplifying surface of the building 200 and directed to the blades 24 of the turbines 16.

Figure 18A:
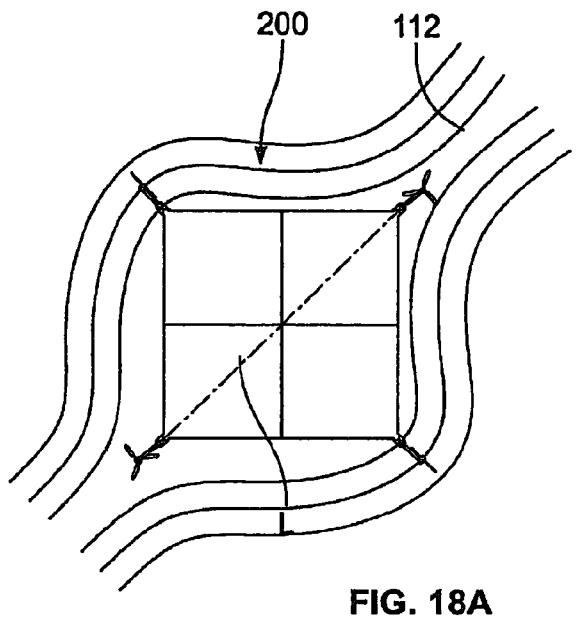
FIG. 18A is a simplified top view of the high-rise building of FIG. 18 illustrating air flow past the building.
Figure 18:
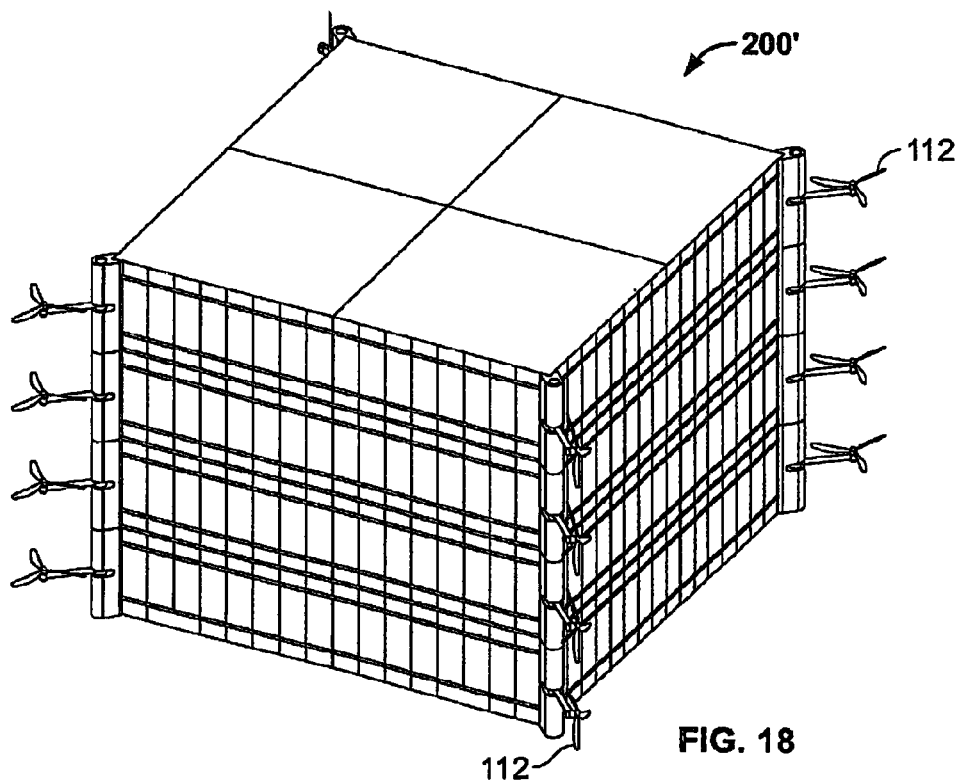
FIG. 18 is an isometric view of an alternative high-rise building incorporating an energy generation system in accordance with the present teachings.

An alternate building constructed in accordance with the present teachings is shown in FIG. 18 and identified at reference character 200'. Wind flow past this alternative building 200' is schematically illustrated in FIG. 18A. The building 200' differs from the building 200 in that turbines 112 are incorporated at each of the four corners. Like reference characters are used to identify similar components to those introduced above.

Though the incorporation of rotors 112 on each of the four corners, the present teachings may take advantage of changing wind conditions. FIG. 18A illustrates wind flow past the building 200' under certain wind conditions. As above, an imaginary line L may bisect the building 200' and be equidistant from the axes of turbines on two opposing corners of the building 200'. These are the active turbines. The turbines 112 on the other two corners may be generally on the imaginary line L and are the inactive turbines 112. The inactive turbines 112 may be switched off and rotates to horizontal positions. If the wind changes by ninety degrees, the active turbines would become the inactive turbines and vice versa.

Figure 19:
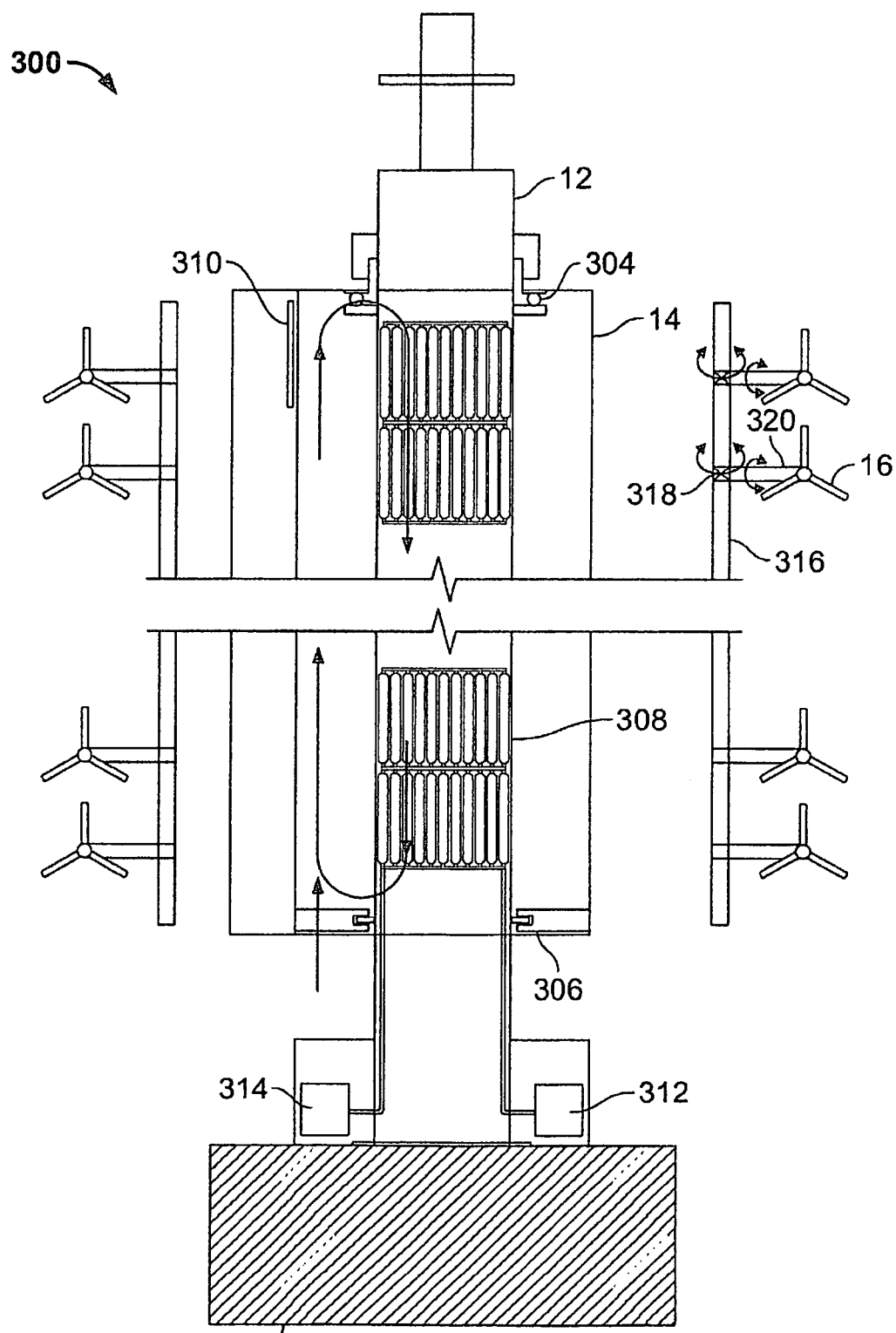
FIG. 19 is a simplified view of an energy generation system in accordance with the present teachings.

Turning to FIG. 19, another energy generation system in accordance with the present teachings is illustrated and generally identified at reference character 300. As above, like reference characters are used to identify substantially similar elements to those introduced above with respect to the prior described embodiments. The inner tower 12 upwardly extends from a foundation 302. The outer shell 14 is rotatably mounted on the inner tower 12. Supporting bearings 304 may be disposed between the inner tower 12 and the outer shell 14. Guiding wheels 306 may be mounted on the rotating outer shell 14 and roll against the inner tower 12. The inner tower 12 may house a plurality of storage tanks 308 for compressed air. PV panels 310 may be mounted on the outer shell 14. It will be understood that the bearings can alternatively be on the bottom and the guiding wheels on the top or any other similar arrangement well known in the art to facilitate the requisite relative motion.

An air motor 312 may be provided that is coupled to an electrical generator for converting compressed air to electricity. Compressors 314 may run on electricity generated by the wind turbines 16. The turbines 16 may be carried by a support pole 316. Gear boxes 318 may be provided for positioning support arms 320.

Figure 20:
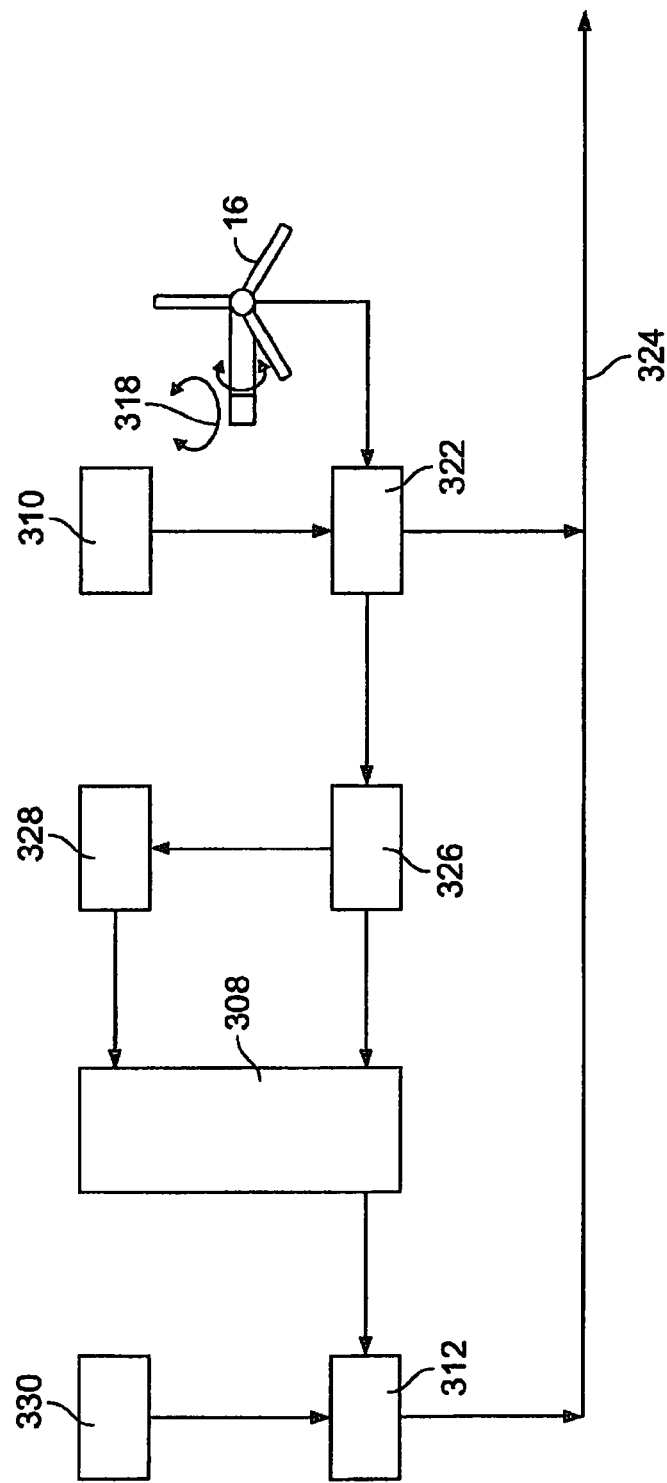
FIG. 20 is schematic diagram generally illustrating the operation of an exemplary energy generation system in accordance with the present teachings, the system shown in partial section.
Figure 25:
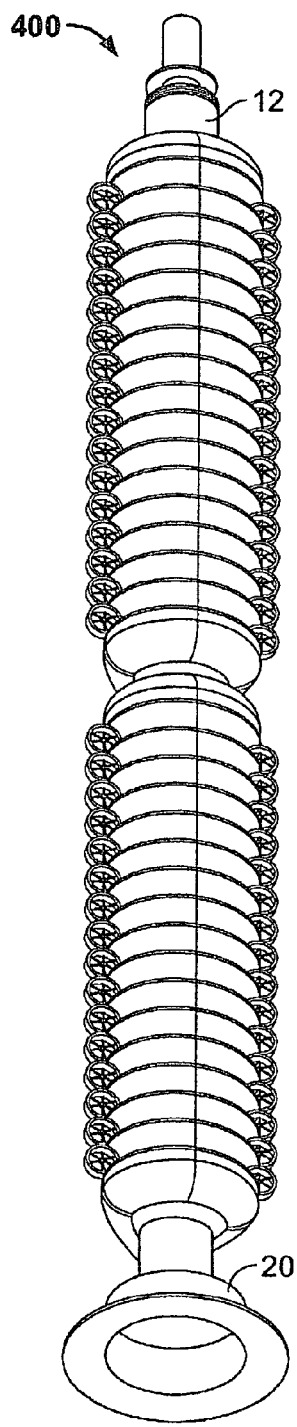
FIG. 25 is another perspective view of the tower of FIG. 21.
Figure 26:
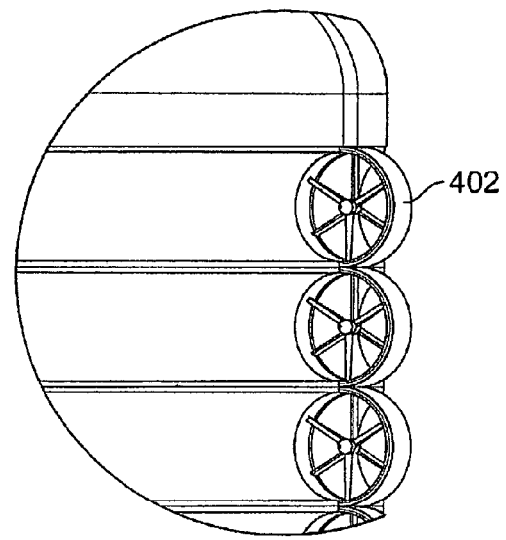
FIG. 26 is an enlarged view of the detail of circle 26 of FIG. 22.
Figure 27:
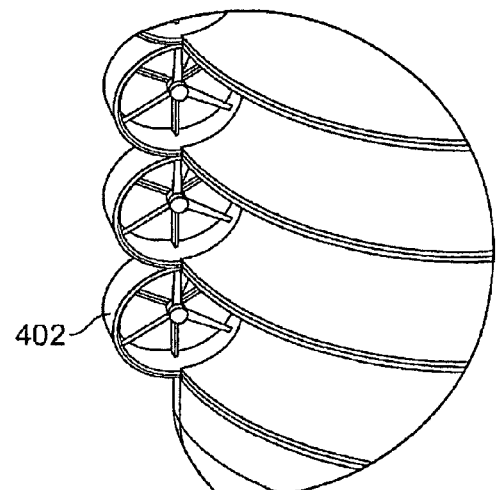
FIG. 27 is an enlarged view of the detail of circle 27 of FIG. 24.

With reference now to FIG. 20, a schematic diagram generally illustrating the operation of an exemplary energy generation system in accordance with the present teachings is illustrated. Again, like reference characters are used to identify substantially similar elements to those introduced above with respect to the prior described embodiments. The vertical or horizontal axis rotors 16 are adjusted to their optimal positions by the gearboxes 318. The rotors 16 generate electrical energy that can be routed through a control panel 322. Electrical energy may also be routed to the control panel 322 from the PV panels 310. From the control panel 322, the electricity may be routed directly to a grid 324.

Alternatively, electricity from the control panel 322 may be diverted to a compressor 326. The compressor 326 may produce compressed air that is delivered to storage tanks 308. The compressor 326 may also produce heat 328 which may be recuperated for compressed air expansion.

Compressed air from the storage tanks 308 may be routed to the air motor 312 that is coupled to a generator for converting compressed air to electricity. Heat 330 from the outer shell 14 may also be directed to the air motor 312. From the electrical generator, electricity may be delivered to the grid 324.

It will be understood by those skilled in the art that the system generally outlined in FIG. 20 is merely exemplary and that the energy captured from wind by the present teachings may be utilized in various other manners. For example, compressed air may be generated directly and the electrical generators associated with the turbines may be replaced with small compressors. Alternatively, three or more turbines may be connected with belts or gears to a single compressor. Other variations will be understood to fall within the scope of the present teachings.

It will now be appreciated that the present teachings provide various arrangements for generating electricity from wind power. The present teachings utilize a tower with many small moving parts that do not disturb the landscape and which may operate at low frequency noises. Systems constructed in accordance with the present teachings are less likely to disturb birds and other wildlife, as compared to the prior art. The wind amplifying surfaces utilized with the present teachings may increase wind speed by a factor of approximately 1.5-1.8. By doing so, the present teachings may generate electricity or power when conventional systems are idle.

As compared to the prior art, the present teachings may be used for urban applications. In this regard, it will further be appreciated that systems constructed in accordance with the present teachings may be more readily installed on top of buildings or adjacent buildings. Furthermore, the present teachings may be integrated directly into buildings, including but not limited to high-rise buildings.

Towers constructed in accordance with the present teachings may be arranged in many different sizes and capacities. The towers can be assembled using conventional tools, scaffoldings and cranes. No large scale cranes are required and special transportation accommodations are not needed. The foundation may be a concrete block, or on a pivot with tension cables at the top.

Turning to FIGS. 21 through 27, another tower for an energy generation system in accordance with the present teachings is illustrated and identified at reference character 400. Like components between the tower 400 and the embodiments described above are identified in the drawings with like reference characters. To the extent not otherwise described herein, the tower 400 will be understood to be constructed to include a system similar to the tower 10.

The tower 400 may be constructed of a plurality of stacked segments. As noted above, the tower 400 may be constructed as a single piece. The stacked segments may each have a generally tear drop shape in a horizontal plane and may each carry a pair of turbines 402. In the embodiment illustrated, the turbines 402 are adapted to rotate about horizontal axes. The turbines 402 may include a rotatable blade and an outer shroud.

The tear drop shape of the segments, and thus the tower 400, is perhaps shown most particularly in the top view of FIG. 23. The tower 400 may be positioned such that the prevailing wind (directionally indicated by arrow 23) impinges a vertex of the tear drop shape. The turbines 402 may be positioned at the laterally outermost points of the tear drop shape, as compared to the vertex. In such an orientation, an imaginary line L may bisect the tower 400 and be equidistant from the turbines 402. As such, the blades of the turbines 402 will directly catch the wind. Additionally, wind will be amplified and deflected by the wind amplifying surface of the tear drop shape of the tower 400 and be directed to the turbines 402.

Certain dimensions are providing in the drawings relative to the embodiment of FIGS. 21 through 27. It will be understood that the particular dimensions are merely exemplary. In this regard, other dimensions may be utilized within the scope of the present teachings.

Turning to FIGS. 28A through 30D, a tower segment for a tower of an energy generation system in accordance with the present teachings is illustrated and identified at reference character 500. Like components between the segment 500 and the embodiments described above are identified in the drawings with like reference characters. The segment 500 will be understood to be adapted to be incorporated into a tower for energy generation such as the tower 400.

The segment 500 differs from the segments of the tower 400 in shape within a horizontal plane. The segment 500 includes opposing vertices 502 that are rounded. The rounded vertices 502 are interconnected by four generally planar sides 504. A first pair of the sides meet at a corner and a second pair of the sides meet at a second corner. An imaginary line L (see FIG. 28B) may bisect the segment 500 and be equidistant from the corners. Turbines 402 may be placed at the corners.

The segment 500 may be positioned such that the prevailing wind (directionally indicated in FIG. 28B by arrow 28B) impinges one of the vertices 502. The turbines 402 may be angled from a line perpendicular to the imaginary line L for purposes of increasing efficiencies. As shown in FIG. 28B, the turbines 402 are oriented generally perpendicular to the imaginary line L. As such, the blades of the turbines 402 will directly catch the wind. Additionally, wind will be amplified and deflected by the wind amplifying surface of the segment 500 and be directed to the turbines 402.

Figure 29B:
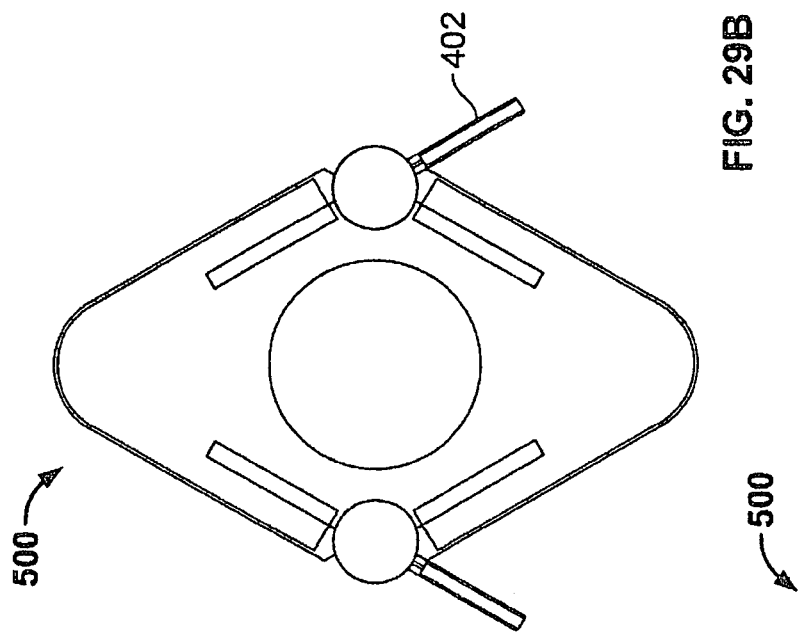
FIG. 29B is a top view of the tower segment of FIG. 29A.
Figure 29C:
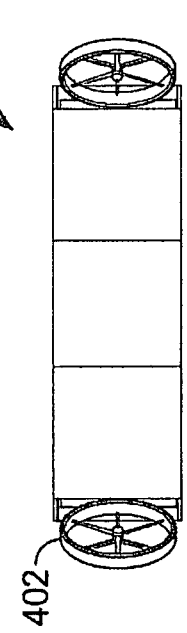
FIG. 29C is a side view of the tower segment of FIG. 29A.
Figure 29A:
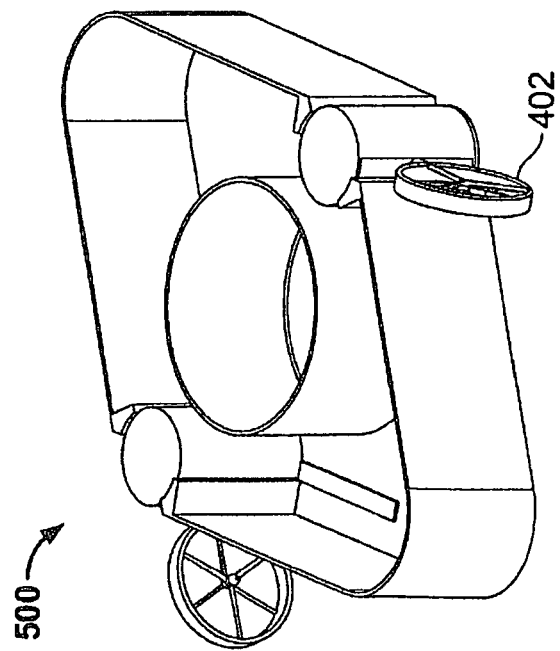
FIG. 29A is a perspective view of the tower segment of FIG. 28A, the two turbines illustrated in a position protected against high winds.
Figure 31:
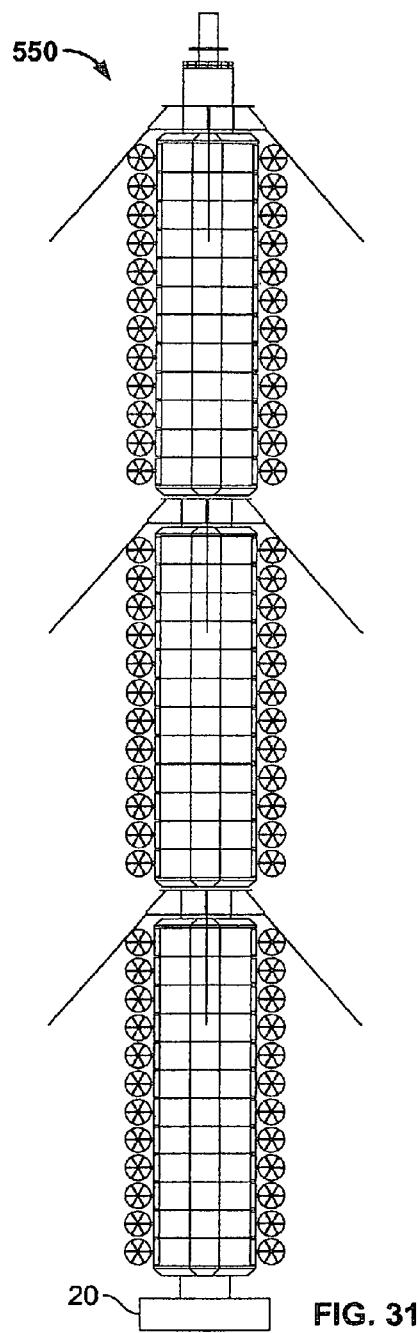
FIG. 31 is a side view of an exemplary tower for an energy generation system incorporating a plurality of stacked segments illustrated in FIG. 28A.
Figure 32:
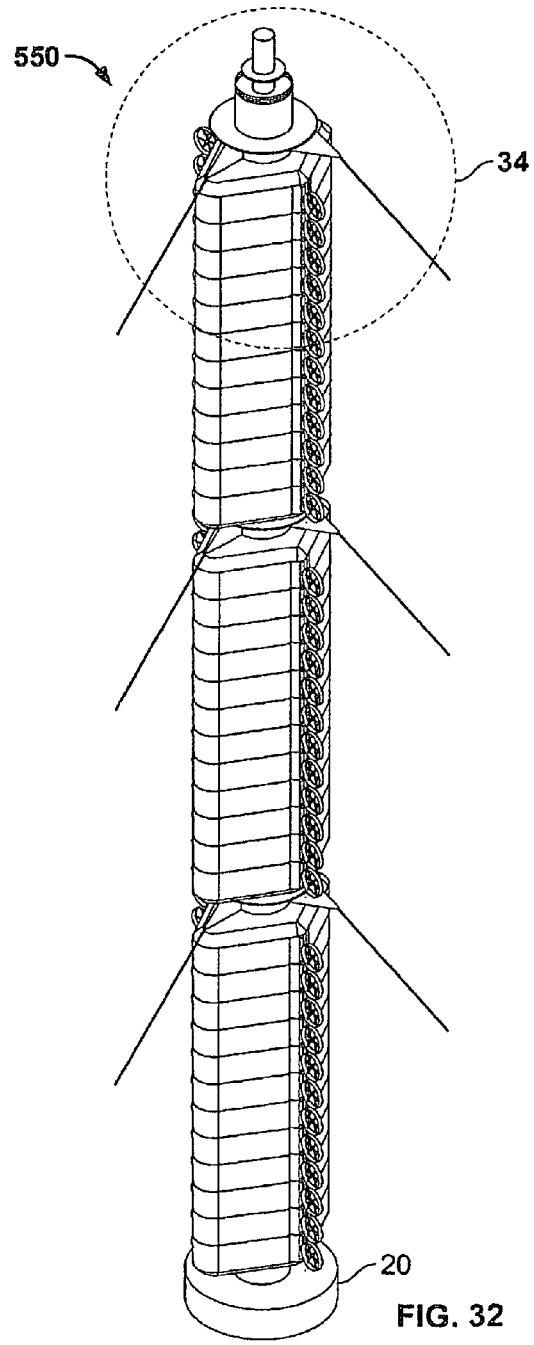
FIG. 32 is a perspective view of the tower of FIG. 31.

FIGS. 28A through 28C illustrated the turbines 402 in operating positions for capturing energy from wind. FIGS. 29A through 29C illustrate the turbines 402 protected from high winds. In FIGS. 30A through 30D, one of the two turbines 402 illustrated retracted to a service position within the segment 500 and another of the turbines 402 is illustrated being moved to the service position.

Turning to FIGS. 31 through 34, an exemplary tower for an energy generation system incorporating a plurality of stacked segments 500 illustrated in FIG. 28A is illustrated and identified at reference character 550. Like components between the tower 550 and the embodiments described above are identified in the drawings with like reference characters. Certain dimensions are provide in the drawings relative to the tower 550 of FIGS. 31 through 34. It will be understood that the particular dimensions are merely exemplary. In this regard, other dimensions may be utilized within the scope of the present teachings.

It is anticipated that the present teachings may be incorporated into various other applications. With reference now to FIGS. 35 through 38, a rail system in accordance with the present teachings is illustrated and identified at reference character 600. Like reference characters are used to identify similar components to those introduced above.

The rail system 600 is generally illustrated to include a shell 602 supported on a plurality of uprights 604. In a manner known in the art and beyond the present teachings, a rail car may travel along the shell 602. The shell 602 is illustrated to include at least one fully closed portion 602A and at least one partially enclosed portion 602B.

The exterior shape of the shell 602 may be consistent with the various embodiments discussed above. In the particular embodiment illustrated, the fully closed portion 602A of the shell 602 has a generally cylindrical cross section in a vertical plane. The cross section may alternatively be diamond shaped, tear dropped shaped, etc. The partially closed portion 602B of the shell 602 may define a portion of a circle or polygon. As illustrated, the partially closed portion 602B may define approximately a half circle. Alternatively, the partial closed portion 602B may be a combination of flat and arcuate surfaces. One such example is shown with respect to the tower 550.

A plurality of turbines 402 may be disposed along a top of the fully closed portion 602A of the shell 602. A plurality of turbines may be also carried at the bottom of the fully closed portion 602A and at the bottom of the partially closed portion 602B. As shown in the side view of FIG. 37, the shape of the shell 602 may have an imaginary line L which bisects the circle and is oriented generally horizontal. The turbines 402 on the top and bottom of the shell 402 may be generally equidistant from the imaginary line L. The turbines 402 may be directly hit with wind. In addition, wind may impinge a lateral side of the shell 602 and be directed to the turbines 402. The partially enclosed portion 602B of the shell 602 may similarly direct wind to the turbines 402 carried on the bottom thereof.

Figure 40:
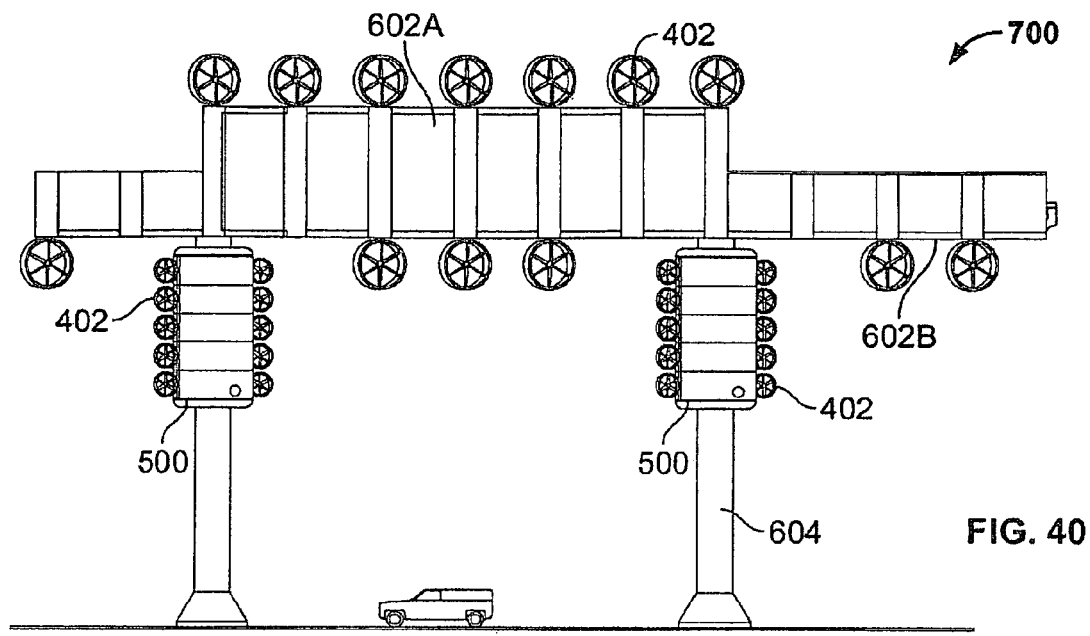
FIG. 40 is a side view of the rail system of FIG. 39.
Figure 41:
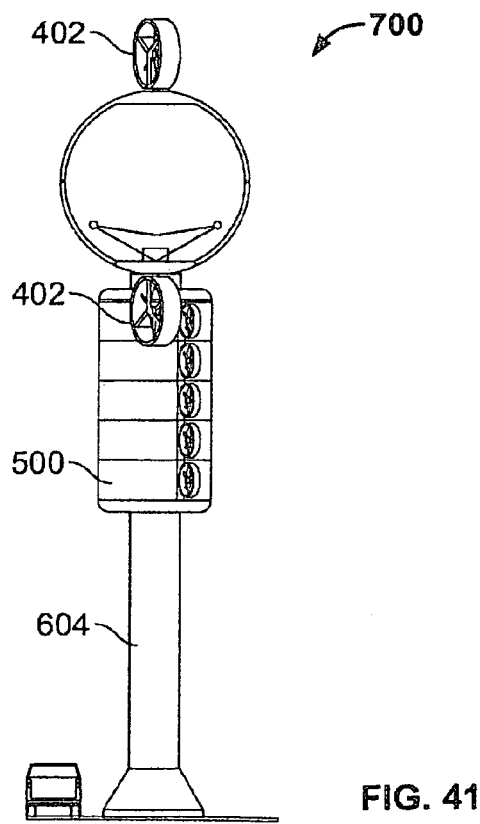
FIG. 41 is an end view of the rail system of FIG. 39.
Figure 46:
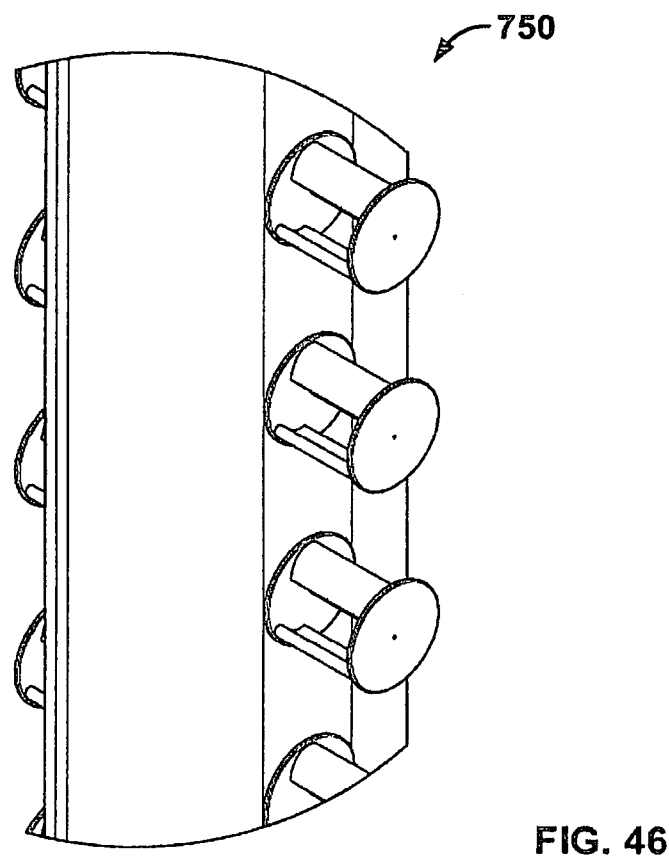
FIG. 46 is an enlarged view of the detail of Circle 46 of FIG. 42.
Figure 47:
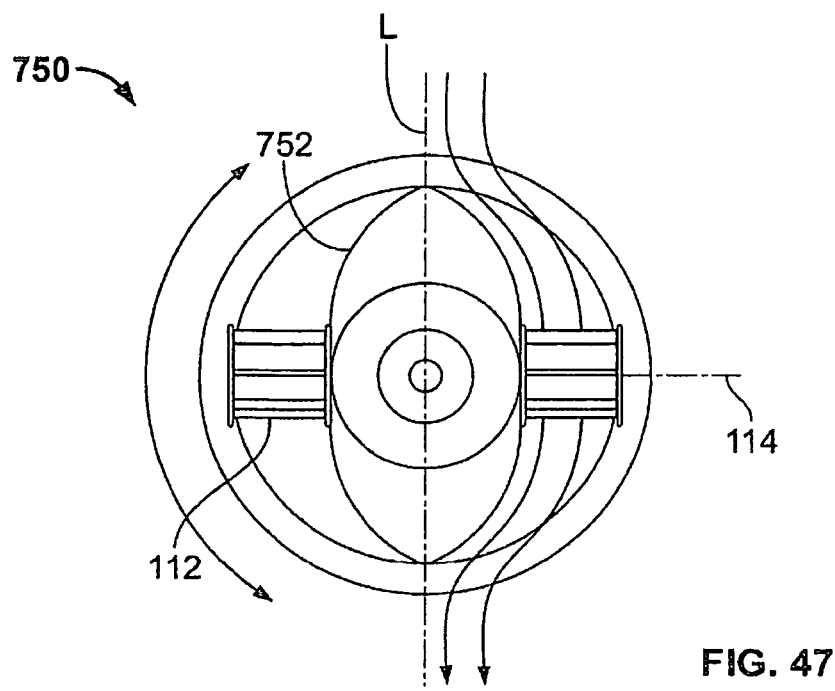
FIG. 47 is a top view of the tower of FIG. 42.
Figure 48:
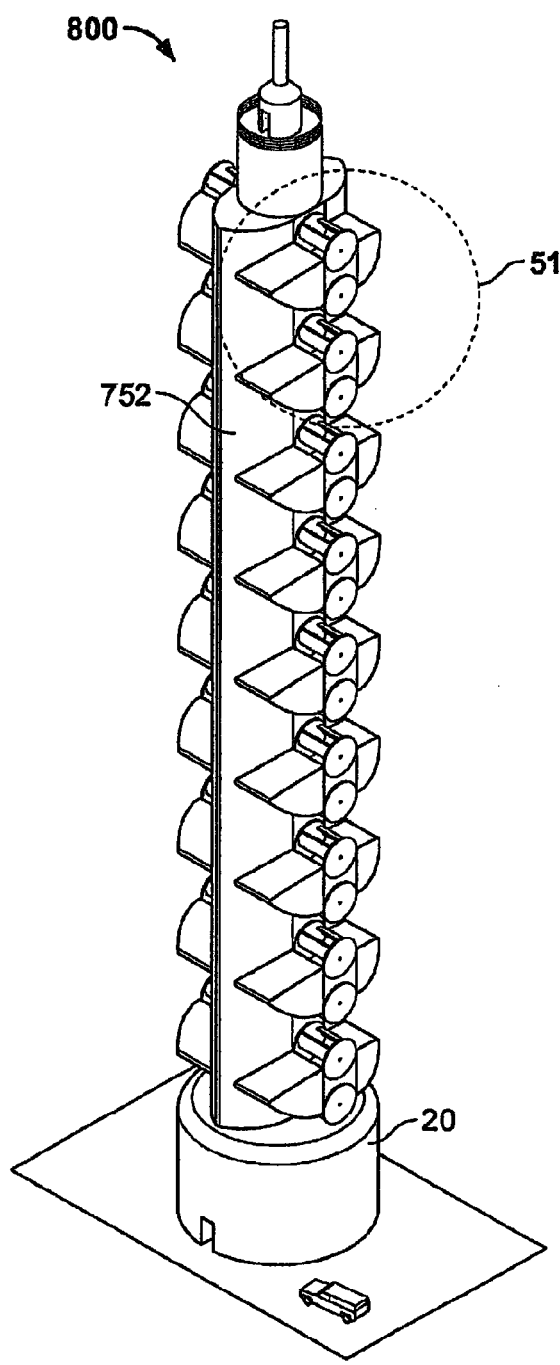
FIG. 48 is an isometric view of another tower for an energy generation system in accordance with the present teachings.
Figure 49:
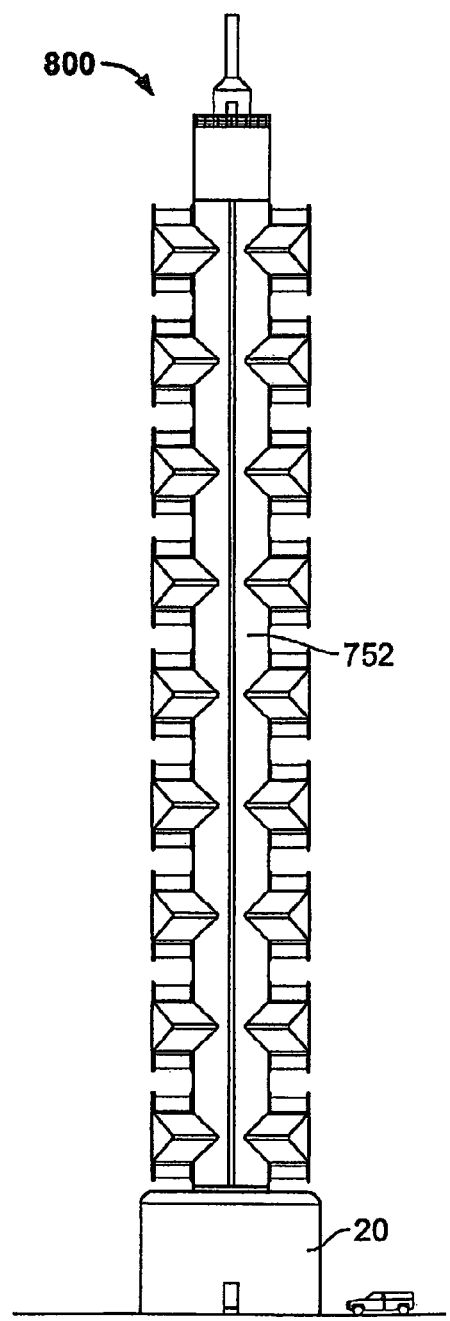
FIG. 49 is a side view of the tower of FIG. 48.
Figure 50:
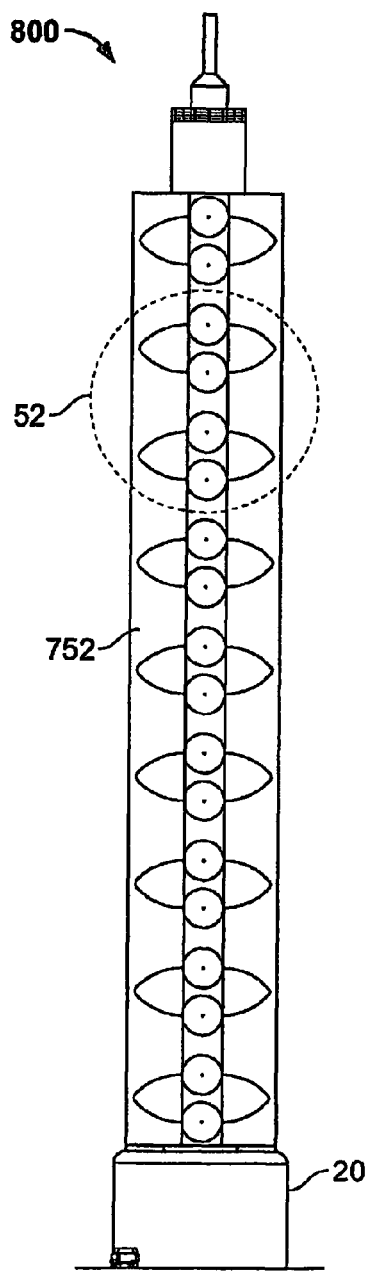
FIG. 50 is another side view of the tower of FIG. 48.
Figure 51:
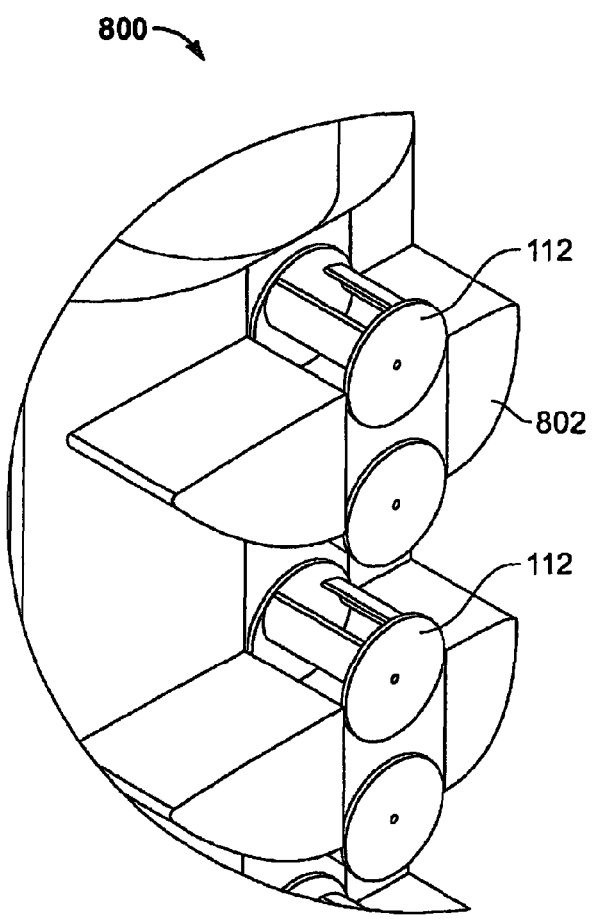
FIG. 51 is an enlarged view of the detail of Circle 51 of FIG. 48B.
Figure 52:
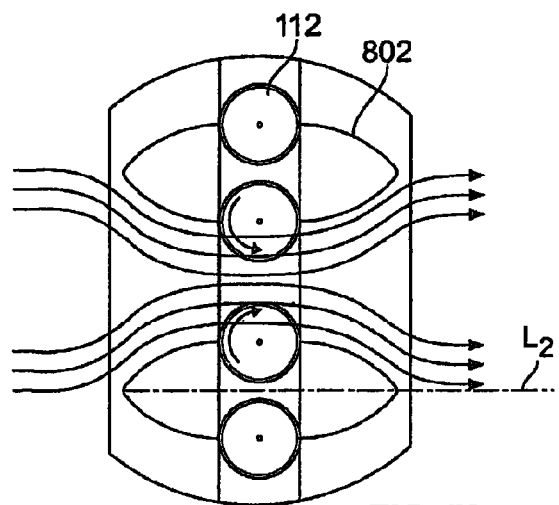
FIG. 52 is an enlarged side view of the detail of Circle 52 of FIG. 50.
Figure 53:
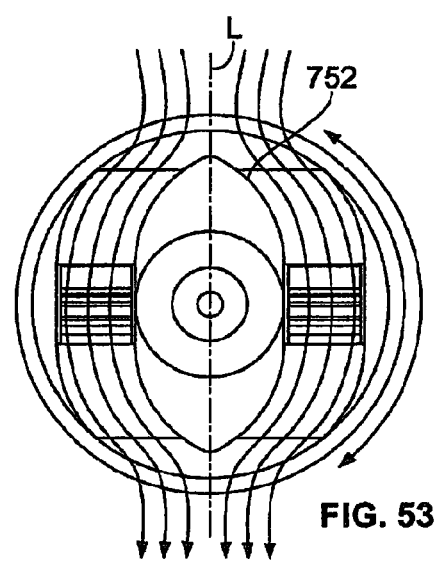
FIG. 53 is a top view of the tower of FIG. 48.
Figure 54:
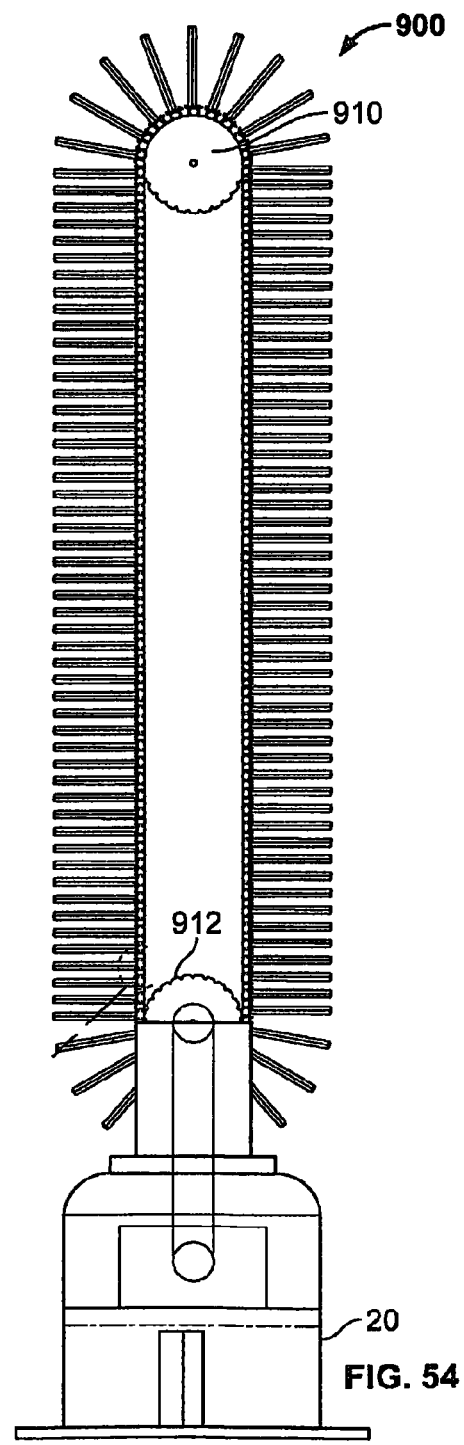
FIG. 54 is a side view of another tower for an energy generation system in accordance with the present teachings, one half of a main body portion of the tower shown removed for purposes of illustration.
Figure 62:
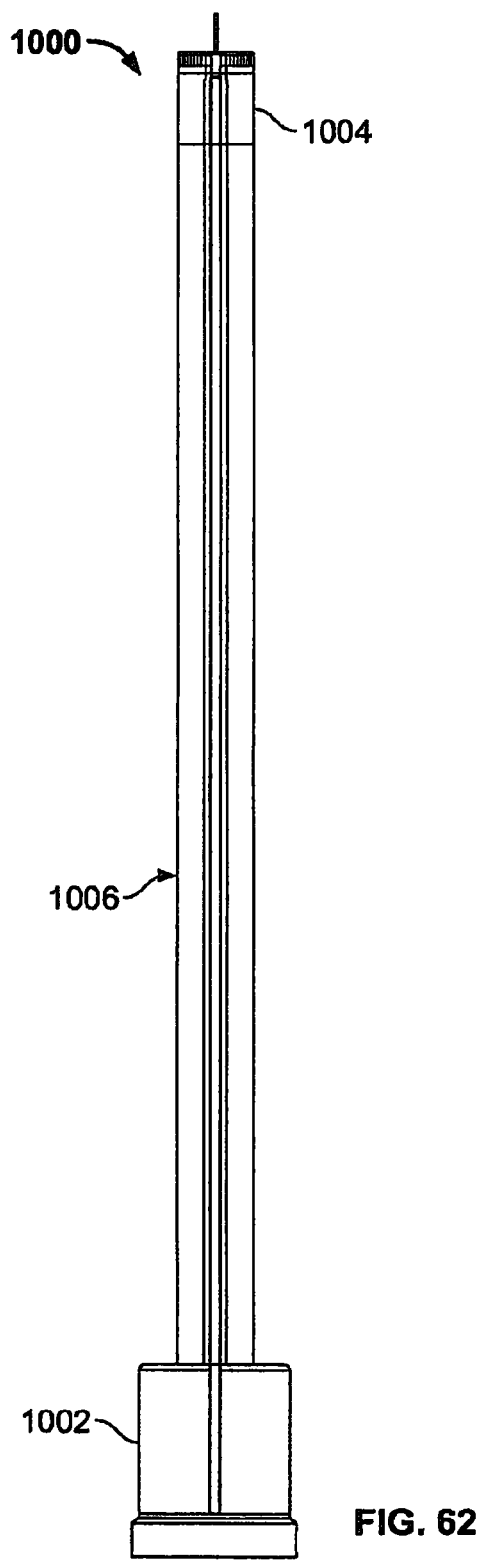
FIG. 62 is a side view of the tower of FIG. 60.
Figure 63:
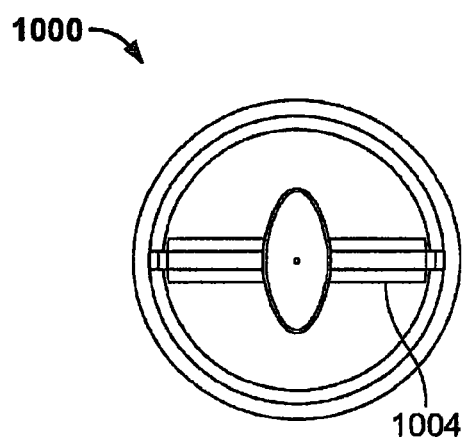
FIG. 63 is a top view of the tower of FIG. 60.
Figure 64:
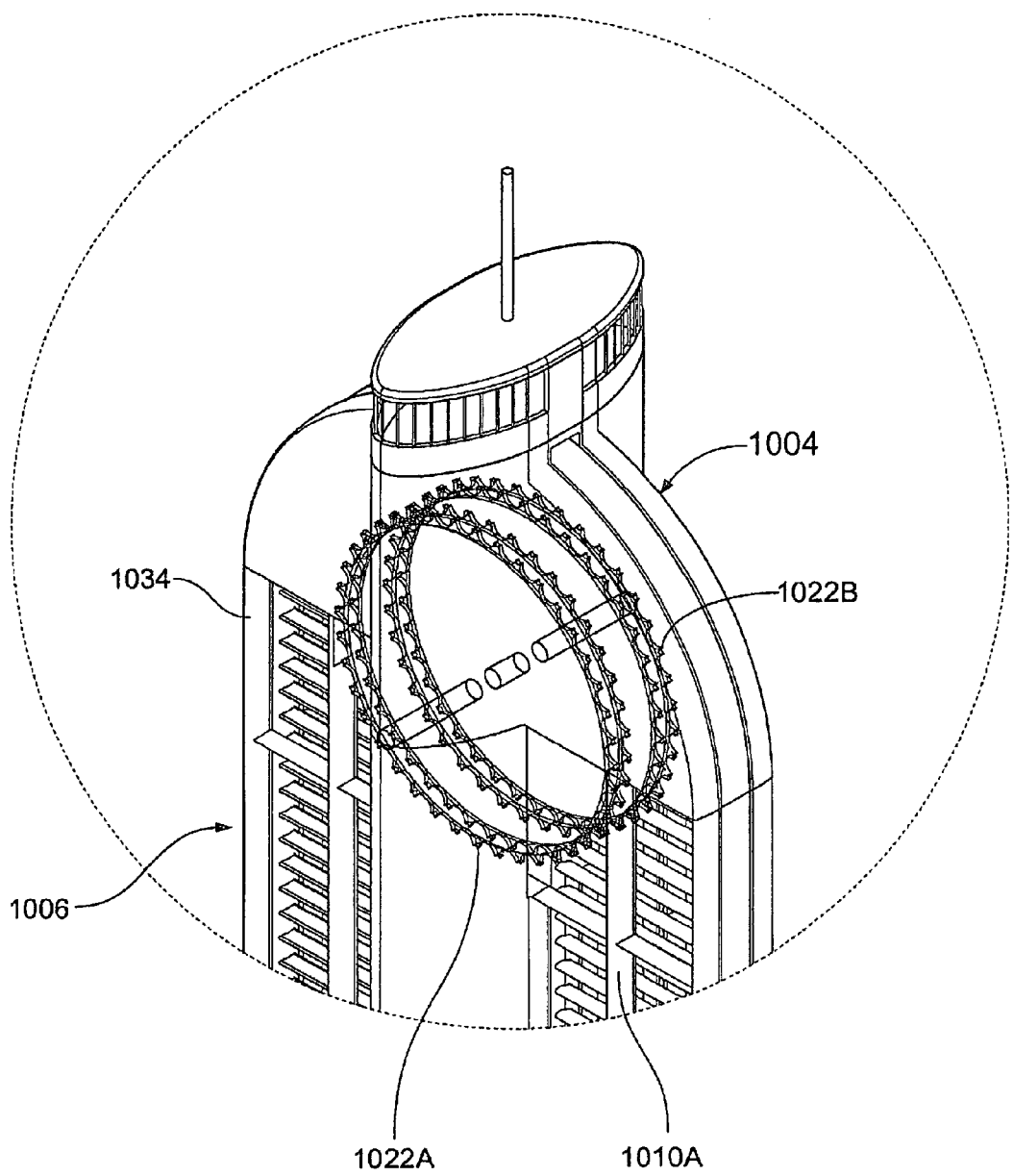
FIG. 64 is an enlarged view of the detail shown in Circle 64 of FIG. 60.

Turning to FIGS. 39 through 41, another rail system in accordance with the present teachings is illustrated and identified at reference character 700. The rail system 700 is similar to the rail system 600 and therefore includes similar reference numbers to identify like elements. The rail system 700 differs from the rail system 600 in that a plurality of turbines 402 are carried on each of the supports 604.

The rail system 700 may incorporate a plurality of segments similar to the segments 500 discussed above. The segments 500 may be carried on the supports 604. The dimensions of the segments 500 and the turbines 402 carried by the segments may be adjusted for this particular use. The segments may have a cylindrical cross section, a tear drop cross section, or any cross section consistent with the descriptions provided above. The segments 500 may be rotatable within a horizontal plane for purposes of efficiently orienting the turbines 402 relative to the prevailing wind. Incorporation of the segments 500 provides an additional opportunity to capture wind energy.

Turning to FIGS. 42 through 47, another tower in accordance with the present teachings is illustrated and generally identified at reference character 750. The tower 750 shares various features with the towers discussed above. As such, like components between the various embodiments are identified in the drawings with like reference characters. To the extent not otherwise described herein, the tower 750 will be understood to be constructed and operate similar to the previously described towers.

The tower 750 may include a main body or outer shell 752 defining a wind amplifying surface. The particular configuration of the main body 752 of the tower 750 is shown most particularly perhaps in the top view of FIG. 47. It will be understood that various other configurations may be used within the scope of the present teachings to amplify and direct the wind. Some suitable configurations are discussed above with respect to the previously described embodiments.

The tower 750 may further include a plurality of turbines 112 configures to rotate about horizontal axes 114. It will be understood that the construction and operation of the horizontal turbines 112 is conventional insofar as the present teachings are concerned. As illustrated, the turbines 112 may be arranged in pairs along a height of the tower 750. The turbines 112 of the pairs may be disposed on opposite sides of the main body 752.

In operation, the main body or outer shell 752 of the tower 750 may be rotationally adjusted relative to the inner tower 12 such that the wind direction is parallel to an imaginary line L bisecting the outer shell 752 and approximately equidistant from the turbines 112. As such, the blades of the turbines 112 will directly catch the wind. Additionally, wind will be amplified and deflected by the wind amplifying surface of the outer shell 752 and directed to the blades of the turbines 112.

Turning to FIGS. 48 through 53, another tower in accordance with the present teachings is illustrated and generally identified at reference character 800. The tower 800 will be understood to be similar to the tower 750. For this reason, like components between the tower 750 and the tower 800 are identified in the drawings with like reference characters. To the extent not otherwise described herein, the tower 800 will be understood to be constructed and operate similar to the tower 750.

In addition to the wind amplifying surface defined by the main body 752, the tower 800 may incorporate a secondary wind amplifying surface. As illustrated, a wind amplifying structure 802 may be incorporated between vertically disposed pairs of turbines 112. One particular configuration of the wind amplifying structure 802 is shown in the drawings. It will be understood that various other configurations may be used within the scope of the present teachings to amplify and direct the wind. Some suitable configurations are discussed above with respect to the previously described embodiments.

The vertically oriented pairs of turbines 112 associated with each wind amplifying structure 802 are located on opposite sides of the wind amplifying structure 802. In operation, the main body or outer shell 752 of the tower 750 may be rotationally adjusted relative to the inner tower 12 such that the wind direction is parallel to the imaginary line L bisecting the outer shell 752 and approximately equidistant from the turbines 112. As such, the blades of the turbines 112 will directly catch the wind. Additionally, wind will be amplified and deflected by the wind amplifying surface of the outer shell 752 and directed to the blades of the turbines 112. Additional winds will be amplified and directed to the turbines 112 by the wind amplifying structures 802. The vertically oriented pairs of turbines 112 associated with each wind amplifying structure 802 may be synchronized to turn in opposite directions.

Turning to FIGS. 54 through 59, another tower in accordance with the present teachings is illustrated and generally identified at reference character 900. The tower 900 shares various features with the towers discussed above. As such, like components between the various embodiments are identified in the drawings with like reference characters. To the extent not otherwise described herein, the tower 900 will be understood to be constructed and operate similar to the previously described towers.

The tower 900 may include a main body or outer shell 902 defining a wind amplifying surface. The particular configuration of the main body 902 of the tower 900 is shown most particularly perhaps in the top view of FIG. 59. It will be understood that various other configurations may be used within the scope of the present teachings to amplify and direct the wind. Some suitable configurations are discussed above with respect to the previously described embodiments. It will be noted, however, that the tower 900 may be utilized with or without a wind amplifying surface.

The tower 900 is illustrated to additionally include a plurality of blades 904. The blades 904 may be adjustably carried by a continuous drive member in the form of a continuous belt 906. A pair of drive chains 908 may be carried along laterally opposite sides of the belt 906. As illustrated perhaps best in the side view of FIG. 54 in which one half of the main body portion 902 has been removed for purposes of illustration, the tower 900 may include upper and lower sprocket wheels 910 and 912. The sprocket wheels 910 and 912 may be interconnected by the chains 908. The lower sprocket wheels 912 may be coupled with a chain or belt to a gearbox and generator or to a compressor.

In operation, the outer shell or main body portion 902 may be rotationally adjusted relative to the base 20 such that the wind direction is parallel to an imaginary line L bisecting the outer shell 902. As such, the blades 904 will directly catch the wind. Additionally, wind will be amplified and deflected by the wind amplifying surface of the outer shell 902 and directed to the blades 904. In response, the belt 906 will be rotated to drive the sprocket wheels 910 and 912 and in turn the gearbox and generator. As noted above, it will be appreciated that the blades 904 can alternatively be driven by fluid. The fluid may be water, for example.

Turning to FIGS. 60 through 69, another tower in accordance with the present teachings is illustrated and generally identified at reference character 1000. The tower 1000 shares various features with the towers discussed above. As such, like components between the various embodiments are identified in the drawings with like reference characters. To the extent not otherwise described herein, the tower 1000 will be understood to be constructed and operate similar to the previously described towers.

The tower 1000 is illustrated to generally include a lower portion or base 1002, an upper portion 1004 and a central portion 1006 between the base 1002 and the upper portion 1004. It will be understood that the front and rear of the tower 1000 are substantial mirror images of one another. In the particular embodiment illustrated, however, the system works only in one direction (i.e., to receive wind currents from the front side). The symmetry of the amplifying surfaces is simply for structural reasons. The base 1002 may support the tower 1000 in a conventional manner insofar as the teachings of the present invention are concerned. The base 1002 may house generator and control systems (as discussed above). The base 1002 may permit the tower 1000 to rotate for purposes of most efficiently capturing energy from current wind currents.

The central portion 1006 may include a plurality of blades 1008. Maintenance of the blades 1008 may be done inside the base 1002. The blades 1008 may have a general shape of an airfoil. The plurality of blades 1008 may be carried by one or more continuous drive members 1010. In the embodiment illustrated, the one or more continuous drive members may comprise a primary or front chain 1010A and a secondary or rear chain 1010B. The blades 1008 may be adjustably carried by the primary and secondary chains 1010A and 1010B. Alternatively, the plurality of blades may be adjustably carried by one or more belts.

The system is based on aerodynamic lift. Airflow over the blades 1008 creates lift. On one side of the tower 1000, the blades 1008 are lifted up and on the other side they are pulled down. The wings of an aircraft work the same manner. Electrical power may be generated by the tower 1008 with or without the amplifying surfaces.

The primary and secondary chains 1010A and 1010B may be similarly constructed. As illustrated, the chains 1010A and 1010B may include a plurality of H-shaped segments 1012. Adjacent segments 1012 may be pivotally connected to one another at a joint defined by a pivot pin 1014. Thus, adjacent segments 1012 may rotate relative to one another about the pin 1014.

Each blade 1008 of the plurality of blades may be interconnected to both of the primary and secondary chains 1010A and 1010B. Each blade 1008 may be associated with a banding 1020. In the embodiment illustrated, each banding 1020 includes an upper portion adjacent an upper side of the associated blade 1008 and a lower portion adjacent the lower side of the associated blade 1008. The banding 1020 provides a structure that is fixedly connected to the blade 1008 for attachment of the blade to the primary and secondary chains 1010A and 1010B.

Each of the segments 1012 of the primary and secondary chains 1010A and 1010B may be associated with a support bracket 1016A and 1016B, respectively. The support brackets 1016A and 1016B may be of any suitable shape and geometry for supporting the blades 1008. In the embodiment illustrated, the support brackets 1016A associated with primary chain 1010A are generally T-shaped. The banding 1020 of a blade 1008 may be pivotally coupled to a leg of the support bracket 1016A.

In the embodiment illustrated, the support brackets 1016B associated with the secondary chain 1010B may be generally C-shaped. A mounting flange of each banding 1020 may be connected to one of the support brackets 1016B by an intermediate member or intermediate arm. The intermediate member may be associated with ball joints at either end for adjustable interconnection with both the mounting flange of the banding 1020 and the support bracket 1016B.

The tower 1000 is illustrated to further include a first or upper pair of wheels 1022 and a second or lower pair of wheels 1024. The upper pair of wheels is located proximate an upper end of the central portion 1006 and includes a first forward wheel 1022A and a first rear wheel 1022B. The upper pair of wheels 1022 is mounted to the tower 1000 for common rotation about a pivot axis defined by a spindle. The lower pair of wheels includes a second forward wheel 1024A and a second rear wheel 1024B that are similarly mounted to the tower 1000 for common rotation about a pivot axis by a spindle. The lower pair of wheels 1024 are located proximate a lower end of the central portion 1006. In one particular application, each of the wheels 1022A, 1022B, 1024A and 1024B has a diameter of approximately 12.72 meters.

The primary chain 1010A is running on the forward wheels 1022A and 1024A. The secondary chain 1010B is running on the rear wheels 1022B and 1024B. The front and rear wheels are connected by a mechanism that allows a slight shift. In this manner, the angle of the blades 1008 may be changed. Explaining further, the front wheels carrying the primary chain 1010A may be connected in fixed positions on the respective spindles. The rear wheels carrying the secondary chain 1010B may move independently, resulting in a pitch change of the blades 1008.

The central portion 1006 may further include at least one wind-amplifying surface 1030. In the embodiment illustrate, the tower is illustrated to include a first wind amplifying surface 1030 associated with a front face of the tower for amplifying wind and directing wind toward the blades 1008 substantially in the manner discussed above with respect to the various prior introduced embodiments. It will be understood that a second wind amplifying surface having a substantially identical shape may be associated with a rear face of the tower 1000.

The wind-amplifying surface 1030 may comprise a fixed structure extending between the base 1002 and the upper portion 1004. The lateral sides of the fixed structure may be mirror images of one another about a horizontal extending midline. In this manner, wind may be directed to the blades 1008 on both lateral sides of the wind-amplifying surface 1030.

In one particular application, the central portion has a height of approximately 161 meters and a width in front view of approximately 17.65 meters. It will be understood, however, that the provided dimensions are merely exemplary and may be adapted for particular applications within the scope of the present teachings.

The central portion 1006 may further include a static frame. The static frame may include a first portion 1032 and a second portion 1034. The first and second portions 1032 of the static frame may define the lateral boundaries of the central portion 1006 in a front view and a rear view. As illustrated, the first and second portions 1032 and 1034 extending completely between the base 1002 and the central portion 1006. In certain applications, the first and second portions 1032 and 1034 may define wind amplifying surfaces for further directing wind currents toward the blades 1008. The horizontal cross section of the first and second portions 1032 and 1034 may be similar to the wind amplifying surface 1030 or any of the wind amplifying surfaces described above with respect to the other embodiments.

The top portion or cap 1004 may upwardly extend the wind amplifying surfaces 1030 of the central portion 106. The top portion 1004 may be secured to the first and second portions 1032 and 1034 of the static frame. The top portion 1004 conceals the upper pair of wheels 1022A and 1022B.

The blades 1008 may be oriented relative to the horizontal in order to maximize the capture of energy from the wind. In one particular application, the blades 1008 are oriented at an angle of approximately 15 degrees with respect to the horizontal. The particular angle may vary with the scope of the present teachings based on factors including but not limited to prevailing wind conditions, real time wind conditions, etc. As discussed above, the angle of the blades 1008 may be adjustable. In certain applications, the angle of the blades 1008 may be automatically adjusted with computer controls based on wind conditions.

In operation, wind currents impact the blades 1008. The wind currents are amplified by the wind-amplifying surface 1030. The wind currents operate to drive the continuous series of blades 1008 in a clockwise direction, as viewed from the front of the tower 1008. Explaining further and with reference from the front of the tower 1008, the wind currents upwardly drive the blades 1008 located on the left side of the wind-amplifying surface 1030 and conversely downwardly drive the blades 1008 located on the right side of the wind-amplifying surface 1030. One or both of the wheels 1024A and 1024B of the lower pair of wheels may be coupled with a generator generally in the manner discussed above. In this manner, driven rotation of the one or both of the wheels 1024A and 1024B results in the generation of energy from the wind currents.

Turning to FIGS. 70 through 72, an alternate arrangement for guiding the blades 1008 of the tower 1008 is illustrated. In the alternative arrangement, the primary and secondary chains 1010A and 1010B are eliminated in favor of a track for continuously guiding the blades 1008. The track 1040 may include first and second portions 1040A and 1040B. The first and second portions may alternatively be referred to as front and rear guiding rails 1040A and 1040B, respectively. The first and second portions 1040A and 1040B may be mirror images of one another and may cooperate to define a channel 1042 for guiding the blades 1008. The track 1040 may be generally oval in shape. FIG. 70 illustrates a lower portion of the track 1040. Outer surfaces of both of the first and second portions 1040A and 1040 may be configured to define wind amplifying surfaces.

Each blade 1008 may be associated with a guide block 1044. The guide blocks 1044 may be fixedly secured to respective ones of the blades 1008. As illustrated, a front side and a rear side of each guide block 1044 are associated with a plurality of guide rolls 1046. In the embodiment illustrated, each side is associated with four (4) guide rolls 1046.

An inner surface of the first and second portions 1040A and 1040B define guide slots 1048 for slidably receiving the guide rolls 1046. The first and second portions 1040A and 1040B may incorporate a guide rail 1050 that cooperates to define the guide slots 1048. Each guide slot 1048 receives a pair of the guide rolls 1046 for guiding the blades 1008 in an oval pattern.

In use, the blades 1008 are stacked in the track 1040 such that adjacent guide blocks 1044 are in contact with one another. In this regard, adjacent guide blocks are touching but are not connected or linked. The guide blocks 1044 function like ball bearings running in a closed loop. Contact surfaces may be coated in Teflon® or other friction reducing material.

Each guide block 1044 may define an engagement cavity 1052. The engagement cavities 1052 may engage a wheel connected to a generator. The blades 1008 are forced around the oval pattern defined by the track 1040 in much the same manner described above with respect to the tower 1000. When the engagement cavities 1052 engage and rotate the wheel connected to the generator, electrical energy is created through turning of the wheel.

Alternative to the above, the guide blocks 1044 may be build as the rotor of a linear motor and the track 1040 may function as the stator. Electricity may be generated by passing the guide blocks 1044 a magnetic field of the track 1040. In such an arrangement, wheels and gear mechanisms connected to a generator may be eliminated.

With reference to FIGS. 73 through 80, another alternate arrangement 1080 for guiding the blades 1008 of the tower 1008 is illustrated. In view of the similarities between the arrangement 1080 of FIGS. 73 through 79 with prior described embodiments, common reference characters have been used to identified substantially identical elements throughout the drawings. The arrangement of FIGS. 73 through 79 differs from the prior arrangement in that the angle of the blades 1008 may be more readily adjusted. To the extent not otherwise illustrated and/or described, it will be understood that the various features of the two alternative arrangements for guiding the blades 1008 are identical.

Each blade 1008 of the arrangement 1080 is associated with first and second guide blocks 1044A and 1044B. The first guide block 1044A is slidably received within the front guide rail 1040A and the second guide block 1044B is slidably received within the rear guide rail 1040B. Both of the guide blocks 1044A and 1044B includes a plurality of guide rolls 1046 that cooperate with the respective guide rail 1040A or 1040B in the manner discussed above.

Each blade 1008 is associated with a banding 1020 identical to that describe above. The first guide block 1044A is connected to the banding 1020 in any manner well known in the art to provide pivoting of the blade 1008 about an axis generally perpendicular to the path of travel of the blade 1008. The second guide block 1044B is adjustably interconnected to the banding 1020 through an intermediate member or arm 1082.

In use, the guide blocks 1044A and 1044B are stacked in the track 1040 such that adjacent guide blocks 1044A and 1044B are in contact with one another. In this regard, adjacent guide blocks 1044A and 1044B are touching but are not connected or linked. The guide blocks 1044A and 1044B function like ball bearings running in a closed loop. As above, contact surfaces may be coated in Teflon® or other friction reducing material.

As above, each guide block 1044 may define an engagement cavity 1052. The engagement cavities 1052 may engage a wheel connected to a generator. The blades 1008 are forced around the oval pattern defined by the track 1040 in much the same manner described above with respect to the tower 1000. When the engagement cavities 1052 engage and rotate the wheel connected to the generator, electrical energy is created through turning of the wheel.

With particular reference to the perspective view of FIG. 80, the arrangement 1080 is illustrated to include a pitch control mechanism 1090 for controlling the pitch of the blades 1008. As shown, the pitch control mechanism may include an actuator 1090 interconnecting one of the first guide blocks 1044A and one of the second guide blocks 1044B. The actuator 1090 may be wirelessly controlled and may be longitudinally adjustable. When the actuator 1090 expands or contracts, the first guide blocks 1044A shift relative to the second guide blocks 1044B and the pitch of the blades 1008 resultantly changes. The pitch control mechanism 1090 is illustrated interconnecting a separate pair of guide blocks 1044A and 1044B for purposes of illustration. Alternatively, the pitch control mechanism 1090 may be integrated with a pair of guide blocks 1044A and 1044B carrying a blade 1008. The pitch control mechanism may include one or more actuators 1090 paired with first and second guide blocks 1044A and 1044B. The number of actuators will depend on the size of the track and the force needed to tilt the blades 1008.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and the appended claims.

What is claimed is:

1. An energy generation system for generating energy from wind, the energy generation system comprising:
   a plurality of blades, each blade of the plurality of blades associated with a respective guide block;

a track for guiding each of the blades of the plurality of blades along a continuous path, the track defining a channel for receiving the guide blocks;

means for converting motion of the guide blocks along the continuous path to electrical energy; and a pitch control mechanism for controlling the pitch of the blades, preferably wherein the pitch control mechanism includes a longitudinally adjustable member interconnecting a pair of guide blocks;

wherein adjacent guide blocks are in contact with one another along the continuous path but not linked to one another.

2. An energy generation system for generating energy from wind, the energy generation system comprising:

a plurality of blades, each blade of the plurality of blades associated with a respective guide block;

a track for guiding each of the blades of the plurality of blades along a continuous path, the track defining a channel for receiving the guide blocks; and a pitch control mechanism for controlling the pitch of the blades, preferably wherein the pitch control mechanism includes a longitudinally adjustable member interconnecting a pair of guide blocks.

3. An energy generation system for generating energy from wind, the energy generation system comprising:

a plurality of blades, each blade of the plurality of blades associated with a respective guide block;

a track for guiding each of the blades of the plurality of blades along a continuous path, the track defining a channel for receiving the guide blocks;

means for converting motion of the guide blocks along the continuous path to electrical energy; and a pitch control mechanism for controlling the pitch of the blades, preferably wherein the pitch control mechanism includes a longitudinally adjustable member interconnecting a pair of guide blocks.

4. The energy generation system according to claim 3, wherein the track comprising first and second portions which cooperate to define the channel, preferably wherein each guide block is associated with a plurality of guide rolls received within guide slots defined by one of the first and second portions.

5. The energy generation system according to claim 3, wherein adjacent guide blocks are in contact with one another along the continuous path but not linked to one another.

6. The energy generation system according to claim 3, wherein the guide blocks define a rotor of a linear motor and the track operates as a stator, the system operative to generate electricity by passing the guide blocks through a magnetic field of the track.

\* \* \* \* \*